United States Patent
Lalgudi et al.

(10) Patent No.: US 8,883,935 B2
(45) Date of Patent: Nov. 11, 2014

(54) HIGH REFRACTIVE INDEX COMPOSITION

(75) Inventors: Ramanathan S. Lalgudi, Westerville, OH (US); Barry L. McGraw, Westerville, OH (US); Robert J. Cain, Lewis Center, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 13/643,584

(22) PCT Filed: Apr. 28, 2011

(86) PCT No.: PCT/US2011/034393
§ 371 (c)(1),
(2), (4) Date: Oct. 26, 2012

(87) PCT Pub. No.: WO2011/139856
PCT Pub. Date: Nov. 10, 2011

(65) Prior Publication Data
US 2013/0046054 A1 Feb. 21, 2013

Related U.S. Application Data

(60) Provisional application No. 61/329,164, filed on Apr. 29, 2010.

(51) Int. Cl.
C08F 226/12 (2006.01)
C08G 77/38 (2006.01)
C08F 271/02 (2006.01)
C08L 83/04 (2006.01)
C08F 220/28 (2006.01)
C08F 230/04 (2006.01)
C08G 77/04 (2006.01)
C08K 3/22 (2006.01)

(52) U.S. Cl.
CPC .............. *C08F 220/28* (2013.01); *C08L 83/04* (2013.01); *C08F 230/04* (2013.01); *C08K 2003/2237* (2013.01); *C08G 77/04* (2013.01); *C08K 3/22* (2013.01)

USPC ........................................................ 525/474

(58) Field of Classification Search
CPC ................................................... C08F 220/28
USPC ........................................................ 524/474
See application file for complete search history.

(56) References Cited

U.S. PATENT DOCUMENTS 2,745,819 A * 5/1956 Mack et al. .................... 524/171
2,823,218 A * 2/1958 Speier et al. .................. 556/415

(Continued)

FOREIGN PATENT DOCUMENTS

DE 102004061323 6/2006
EP 1791002 5/2007

(Continued)

*Primary Examiner* — Mike M Dollinger
(74) *Attorney, Agent, or Firm* — Yimei C. Hammond; Kremblas & Foster

(57) ABSTRACT

A high refractive index composition comprising a reaction product of one or more first organic compounds capable of undergoing polymerization and one or more second compounds with high refractive index, and the method of making and using the composition.

A composition comprising an organic compound obtained by coupling two reactive groups (a) and (b), wherein
  a. the reactive group (a) is $Y—(CH_2)n-M(O—R)_3$, wherein R is $CH_3$, $C_2H_5$, $C_3H_8$, $C_4H_{10}$; and Y is $—NH_2$, —COOH, —NCO, or epoxy; and wherein M is selected from the group consisting of Ti, Zr, V, Mg, Al, Mn, Sb, Ba, Ca, Ce, Si, and Sn; and
  b. the reactive group (b) is selected from the group consisting of carbazole, fluorene, imidazole with one or more functional groups selected from —OH, $—NH_2$, —COOH, —NCO, -epoxy, -vinyl, -acrylic, -acyl, -alkyl, -halide, -amino, -ketone, -allyl, -allylic, -thiol, -isocyanate, and a mixture thereof;
and the method of making and using the composition.

10 Claims, 10 Drawing Sheets

(56) References Cited

U.S. PATENT DOCUMENTS

| | | | |
|---|---|---|---|
| 3,984,581 A | 10/1976 | Dobler et al. | |
| 4,161,547 A | 7/1979 | Kienel | |
| 4,161,560 A | 7/1979 | Kienel | |
| 4,168,113 A | 9/1979 | Chang et al. | |
| 4,765,729 A | 8/1988 | Taniguchi | |
| 4,830,879 A | 5/1989 | Debsikdar | |
| 4,895,767 A | 1/1990 | Mori et al. | |
| 5,106,671 A | 4/1992 | Amberger et al. | |
| 5,118,579 A | 6/1992 | Aharoni et al. | |
| 5,139,879 A | 8/1992 | Aharoni et al. | |
| 5,173,368 A | 12/1992 | Belmares | |
| 5,178,955 A | 1/1993 | Aharoni et al. | |
| 5,181,141 A | 1/1993 | Sato et al. | |
| 5,198,267 A | 3/1993 | Aharoni et al. | |
| 5,332,618 A | 7/1994 | Austin | |
| 5,392,156 A | 2/1995 | Kumagai et al. | |
| 5,559,192 A * | 9/1996 | Bors et al. | 525/300 |
| 5,728,456 A | 3/1998 | Adair et al. | |
| 5,856,018 A | 1/1999 | Chen et al. | |
| 5,891,362 A | 4/1999 | Watanabe et al. | |
| 5,925,438 A | 7/1999 | Ota et al. | |
| 5,952,084 A | 9/1999 | Anderson et al. | |
| 5,976,680 A | 11/1999 | Ikemori et al. | |
| 5,991,081 A | 11/1999 | Haaland et al. | |
| 6,066,401 A | 5/2000 | Stilburn | |
| 6,177,131 B1 | 1/2001 | Glaubitt et al. | |
| 6,372,354 B1 | 4/2002 | Park et al. | |
| 6,379,788 B2 | 4/2002 | Choi et al. | |
| 6,432,526 B1 | 8/2002 | Arney et al. | |
| 6,464,822 B1 | 10/2002 | Choi et al. | |
| 6,605,229 B2 | 8/2003 | Steiner et al. | |
| 6,632,513 B1 | 10/2003 | Choi et al. | |
| 6,638,630 B2 | 10/2003 | Park et al. | |
| 6,720,081 B2 | 4/2004 | Vitt et al. | |
| 6,800,378 B2 | 10/2004 | Hawa et al. | |
| 6,815,056 B2 | 11/2004 | Choi et al. | |
| 6,841,190 B2 | 1/2005 | Liu et al. | |
| 6,852,406 B2 | 2/2005 | Marechal et al. | |
| 6,890,458 B2 | 5/2005 | Weber et al. | |
| 6,950,236 B2 | 9/2005 | Hokozono et al. | |
| 6,972,136 B2 | 12/2005 | Koenig et al. | |
| 7,008,690 B2 | 3/2006 | Caron et al. | |
| 7,022,401 B2 | 4/2006 | Obayashi et al. | |
| 7,083,851 B2 | 8/2006 | Faris | |
| 7,106,515 B2 | 9/2006 | Mitsuishi et al. | |
| 7,149,032 B2 | 12/2006 | Ohishi et al. | |
| 7,169,441 B2 | 1/2007 | Vitt et al. | |
| 7,175,878 B2 | 2/2007 | Helmstetter et al. | |
| 7,629,424 B2 | 12/2009 | Malik et al. | |
| 2002/0030882 A1 | 3/2002 | Vitt et al. | |
| 2004/0171743 A1* | 9/2004 | Flaim et al. | 524/577 |
| 2005/0158591 A1 | 7/2005 | Arfsten et al. | |
| 2005/0179995 A1 | 8/2005 | Nikolov et al. | |
| 2005/0195486 A1 | 9/2005 | Sasaki et al. | |
| 2005/0219705 A1 | 10/2005 | Tanaka | |
| 2006/0023311 A1 | 2/2006 | Scherer et al. | |
| 2006/0065989 A1 | 3/2006 | Druffel et al. | |
| 2006/0078717 A1 | 4/2006 | Yamaya et al. | |
| 2006/0099407 A1 | 5/2006 | Wang et al. | |
| 2006/0139757 A1 | 6/2006 | Harris et al. | |
| 2006/0147177 A1 | 7/2006 | Jing et al. | |
| 2006/0147614 A1 | 7/2006 | Mizuno | |
| 2006/0147674 A1 | 7/2006 | Walker, Jr. et al. | |
| 2006/0147702 A1 | 7/2006 | Pokorny et al. | |
| 2006/0147703 A1 | 7/2006 | Walker, Jr. et al. | |
| 2006/0147723 A1 | 7/2006 | Jing et al. | |
| 2006/0147724 A1 | 7/2006 | Mizuno | |
| 2006/0147729 A1 | 7/2006 | Mizuno | |
| 2006/0257557 A1 | 11/2006 | Scherer et al. | |
| 2006/0275627 A1 | 12/2006 | Biteau et al. | |
| 2007/0020388 A1 | 1/2007 | Huang et al. | |
| 2007/0042174 A1* | 2/2007 | Rao et al. | 428/323 |
| 2007/0065638 A1 | 3/2007 | Wang et al. | |
| 2007/0139780 A1 | 6/2007 | Suzuki et al. | |
| 2007/0141114 A1 | 6/2007 | Muisener et al. | |
| 2007/0141854 A1 | 6/2007 | Chao et al. | |

FOREIGN PATENT DOCUMENTS

| | | |
|---|---|---|
| JP | 2004-309898 | 4/2004 |
| JP | 2005-274938 | 6/2005 |
| JP | 2005-227381 | 8/2005 |
| JP | 2005-290133 | 10/2005 |
| JP | 2005-301004 | 10/2005 |
| JP | 2005-316426 | 11/2005 |
| JP | 2006-039239 | 2/2006 |
| JP | 2006-206832 | 8/2006 |
| JP | 2006-213748 | 8/2006 |
| JP | 2006-267561 | 10/2006 |
| JP | 2006-342311 | 12/2006 |
| JP | 2006-349830 | 12/2006 |
| JP | 2007-062101 | 3/2007 |
| JP | 2007-076297 | 3/2007 |
| JP | 2007-094150 | 4/2007 |
| KR | 2004076422 | 10/2006 |
| WO | 2004002735 | 1/2004 |
| WO | 2004086104 | 10/2004 |
| WO | 2006093748 | 9/2006 |
| WO | 2006122308 | 11/2006 |
| WO | 2007071723 | 6/2007 |

* cited by examiner

HIGH REFRACTIVE INDEX COMPOSITION

FIELD OF THE INVENTION

The invention is useful for making high refractive index compositions, anti-reflective coatings, coating solar panels, photovoltaic devices, wind turbines, UV light resistant coatings and paints, packaging materials, and in forming organic-inorganic hybrid compositions.

BACKGROUND OF THE INVENTION

The majority of high refractive index materials are inorganic materials such as $TiO_2$, Ge, and PbS, which are useful in making all types of glasses. Glasses can also be prepared to have refractive indices in the range of 1.4 to 2.4.

However, such inorganic materials are brittle and involve cumbersome processing steps. Polymers would be a more preferable material, given their mechanical and processing qualities. However, most of the processable polymers generally have refractive indices ranging from 1.4 to 1.6. Mixing high refractive index inorganic and low refractive index polymer gives a composite with an average refractive index. The factors that enhance refractive index, such as increasing the loading of high refractive index particles, tend to reduce the transparency due to scattering. Furthermore, dispersion of compositions at such high loading (usually >30 volume percent) is still a major challenge. It is therefore one object of the present invention to produce processable high refractive index compositions.

Related art is discussed in the Transition Metal Based Hybrid Organic-Inorganic Copolymers by In, Martin, et al., Journal of Sol-Gel Science and Technology, Vol. 5, No. 2, pp. 101-114 (January 1995).

In addition, it is an object of the present invention to provide high refractive index compositions that are also useful in modifying light absorbance, such as ultra-violet light absorption.

It is well known that ultraviolet absorber compounds have been utilized for a number of protective applications, including within compositions for covering skin, on and within apparel and other types of textiles, within transparent or non-transparent plastic containers, paints, and the like, to combat the harmful and degradable effects of certain wavelengths of light in the UV spectrum.

The best known UV absorbers are benzotriazoles, available from Ciba under the tradename Tinuvin R™, and benzophenones, available from Cytec Industries under the trademark Cyasorb™. Such compounds are highly effective in their UV absorber capacity; however, they provide UV protection over a relatively narrow range of wavelengths (sub.max from about 290 to about 340 nm for benzotriazoles; from 260 to 300 nm for benzophenones), which ultimately leaves a potentially damaging range of unprotected UV exposure (to about 400 nm). Attempts to increase the amount of such UV absorber compounds in order to provide potential protection over such a broader wavelength range are ineffective. Thus, there exists a need to provide a highly effective ultraviolet absorber that can provide protection over the range of wavelengths in the UV spectrum from about 290 to about 400 nm. Therefore, another object of the present invention is to produce highly effective ultraviolet absorptive compositions that can absorb UV light over a broader range of wavelengths typically to about 350 nm or about 400 nm.

BRIEF DESCRIPTION OF THE INVENTION

Broadly, the invention provides for compositions useful in modifying light transmittance and/or light absorbance and methods of making and using the compositions. In some broad embodiments, the composition comprises a reaction product of a. one or more first organic compounds capable of undergoing free radical, ionic, anionic/cationic dipolar addition or condensation polymerization; and b. one or more second compounds with high refractive index, wherein the second compound is capable of undergoing polymerization and/or sol-gel condensation.

In the present application, the term "reaction product" refers to both physical and/or chemical interactions between chemical compounds, such as complexing, chemical reaction, polymerization, co-polymerization sol-gel condensation, interpenetration, and the like.

Preferably, the first organic compound comprises one or more functional groups comprising —OH, —NH₂, —CHO, —C═O, —COOH, —NCO, -epoxy, -vinyl, -acrylic, -acyl, -alkyl, -halide, -amino, -ketone, -allyl, -thiol, -isocyanate, -styrenic, or a mixture thereof.

According to some embodiments, the first organic compound comprises an acrylate compound, a diketonate compound of structure 1, or a mixture thereof;

wherein the diketonate compound of structure 1 comprises

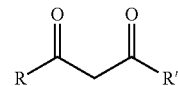

wherein R or R'=H, an alkyl group having up to 12 carbons, an acrylic group, a carboxylic group, an vinyl group, a ketone group, an allyl group, or a mixture thereof.

More preferably, the first organic compound is 2-(methacryloyloxy)ethyl 3-oxobutanoate (also called AAEM).

According to some embodiments, the second compound comprises a. an organic compound (1) obtained by coupling two reactive groups (a) and (b), wherein
  i. the reactive group (a) is (a) is Y—(CH₂)n-M(O—R)₃, wherein R is CH₃, C₂H₅, C₃H₈, C₄H₁₀; and Y is —NH₂, —COOH, —NCO, or epoxy; and wherein M is selected from the group consisting of Ti, Zr, V, Mg, Al, Mn, Sb, Ba, Ca, Ce, Si, and Sn; and
  ii. the reactive group (b) is selected from the group consisting of carbazole, fluorene, imidazole with one or more functional groups selected from —OH, —NH₂, —COOH, —NCO, -epoxy, -vinyl, -acrylic, -acyl, -alkyl, -halide, -amino, -ketone, -allyl, -allylic, -thiol, -isocyanate, and a mixture thereof;
b. an organic compound (2) comprising carbazole, fluorene, imidazole, diketonate, or a mixture thereof;
c. an optional metal alkoxide; and
d. a mixture thereof.

Preferably, the reactive group (a) is 3-(triethoxysilyl)propyl isocyanate, and the reactive group (b) is 2-(9H-carbazole-9-yl)ethanol.

Preferably, the organic compound (2) comprises one or more functional groups comprising —OH, —NH₂, —CHO, —C═O, —COOH, —NCO, -epoxy, -vinyl, -acrylic, -acyl, -alkyl, -halide, -amino, -ketone, -allyl, -thiol, -isocyanate, or a mixture thereof.

More preferably, the organic compound (2) comprises a compound A, a compound B, a compound C, or a mixture thereof; wherein a. the compound A comprises

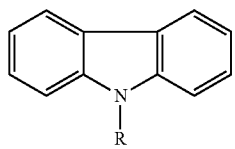

wherein R is —H,

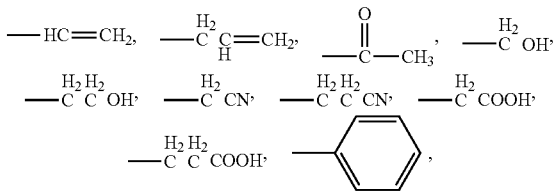

or a mixture thereof;

b. the compound B comprises

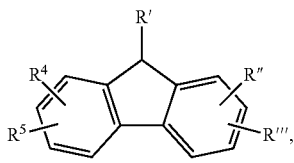

wherein R' is —H, —OH, —CHO, —C=O, or —COOH; R" is —H, —F, —OH, NH$_2$, —COOH, -acyl, -allyl, -ketone, -isocyanate; and R''' is —NH$_2$, or -the compound A; R$^4$ is —H, —F, —OH, NH$_2$, —COOH, -acyl, -allyl, -ketone, -isocyanate; and R$^5$ is —NH$_2$, or -the compound A; and c. the compound C comprises

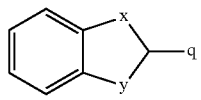

where x is —S, —N, or —O; y is —N or —C; and q is

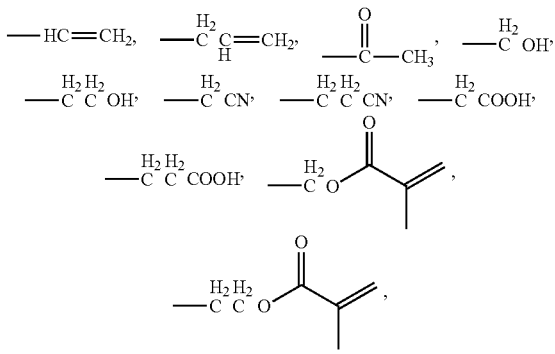

or a mixture thereof.

In some more preferred embodiments, the diketonate compound comprises a structure 2, a structure 3, or a mixture thereof, wherein a. the structure 2 comprises

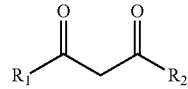

wherein R$_1$ and/or R$_2$=an aromatic ring, a poly-aromatic ring, or a mixture thereof; and b. the structure 3 comprises

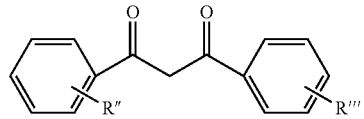

wherein R" and/or R'''=H, an aromatic ring, a poly-aromatic ring, a carboxylic group, an vinyl group, a halide group, a ketone group, an allyl group, or a mixture thereof.

Preferably, the metal in the optional metal alkoxide is selected from the group consisting of Ti, Zr, V, Mg, Al, Mn, Sb, Ba, Ca, Ce, Si, and Sn. More preferably, the metal alkoxide is titanium alkoxide with a general formula of Ti(OR$_3$)$_4$ wherein R$_3$ is an alkyl group having up to 8 carbon atoms.

According to some alternative embodiments, the present invention provides for a method of making a high refractive index composition, which comprises a. mixing at least one first organic compound capable of undergoing polymerization, at least one second compound with high refractive index that is capable of undergoing polymerization, an optional initiator, an optional catalyst, and an optional solvent;
b. forming the resulting mixture into a preproduct, and
c. reacting the preproduct at a temperature wherein the high refractive index composition is produced.

Preferably, the temperature in step c is in the range of about 40° C. to about 120° C.

Preferably, the first organic compound comprises organic compounds with functional groups comprising —OH, —NH$_2$, —CHO, —C=O, —COOH, —NCO, -epoxy, -vinyl, -acrylic, -acyl, -alkyl, -halide, -amino, -ketone, -allyl, -thiol, -isocyanate, -styrenic, or a mixture thereof.

Preferably, the second compound comprises
a. an organic compound (1) obtained by coupling two reactive groups (a) and (b), wherein
  i. the reactive group (a) is (a) is Y—(CH$_2$)n-M(O—R)$_3$, wherein R is CH$_3$, C$_2$H$_5$, C$_3$H$_8$, C$_4$H$_{10}$; and Y is —NH$_2$, —COOH, —NCO, or epoxy; and wherein M is selected from the group consisting of Ti, Zr, V, Mg, Al, Mn, Sb, Ba, Ca, Ce, Si, and Sn; and
  ii. the reactive group (b) is selected from the group consisting of carbazole, fluorene, imidazole with one or more functional groups selected from —OH, —NH$_2$, —COOH, —NCO, -epoxy, -vinyl, -acrylic, -acyl, -alkyl, -halide, -amino, -ketone, -allyl, -allylic, -thiol, -isocyanate, and a mixture thereof;
b. an organic compound (2) comprising carbazole, fluorene, imidazole, diketonate, or a mixture thereof;
c. an optional metal alkoxide; and
d. a mixture thereof.

In some alternative embodiments, the present invention provides for a composition, which comprises an organic compound obtained by coupling two reactive groups (a) and (b), wherein a. the reactive group (a) is (a) is Y—(CH$_2$)n-M(O—R)$_3$, wherein R is CH$_3$, C$_2$H$_5$, C$_3$H$_8$, C$_4$H$_{10}$; and Y is —NH$_2$, —COOH, —NCO, or epoxy; and wherein M is selected from the group consisting of Ti, Zr, V, Mg, Al, Mn, Sb, Ba, Ca, Ce, Si, and Sn; and b. the reactive group (b) is selected from the group consisting of carbazole, fluorene, imidazole with one or more functional groups selected from —OH, —NH$_2$, —COOH, —NCO, -epoxy, -vinyl, -acrylic, -acyl, -alkyl, -halide, -amino, -ketone, -allyl, -allylic, -thiol, -isocyanate, and a mixture thereof.

Preferably, the reactive group (a) is 3-(triethoxysilyl) propyl isocyanate, and the reactive group (b) is 2-(9H-carbazol-9-yl)ethanol.

Preferably, the composition is ultra-violet light absorptive.

This organic compound is the same as the organic compound (1). The present invention provides a method for producing this composition, which comprises (1) providing the reactive group (a) and the reactive group (b); (2) adding the reactive group (a) to the reactive group (b); and (3) reacting the mixture at a temperature wherein the composition is produced.

According to some embodiments, the present invention provides a method for using the above compositions for coating solar panels, photovoltaic devices, wind turbines, UV light resistant coatings and paints, packaging materials, antireflective coatings, or mixtures thereof.

According to some alternative embodiments, the present invention provides for an interpenetrating composition comprising a reaction product of (1) one or more first organic compounds capable of undergoing free radical, ionic, anionic/cationic dipolar addition or condensation polymerization; (2) one or more second compounds with high refractive index, wherein the second compound is capable of undergoing polymerization and/or sol-gel condensation; and (3) one or more silicone resins, wherein the silicone resins comprise one or more high viscosity resins, one or more low viscosity silicone resins, or a mixture thereof.

The first organic compound and the second compound are described above. Preferably, the low viscosity silicone resin comprises poly(alkyl aryl siloxanes) with a terminal functional group selected from vinyl, silanol, hydride, amine, carboxylic, azide, or a mixture thereof.

According some alternative embodiments, the present invention provides for a composition comprising a reaction product of a. an organic compound with fused aromatic and spiro functional groups, wherein the organic compound is capable of reacting with epoxy groups; and b. a silicone polymer with one or more functional groups selected from -epoxy, -isocyanate, or a mixture thereof.

DETAILED DESCRIPTION OF THE INVENTION AND BEST MODE

Figure 1:
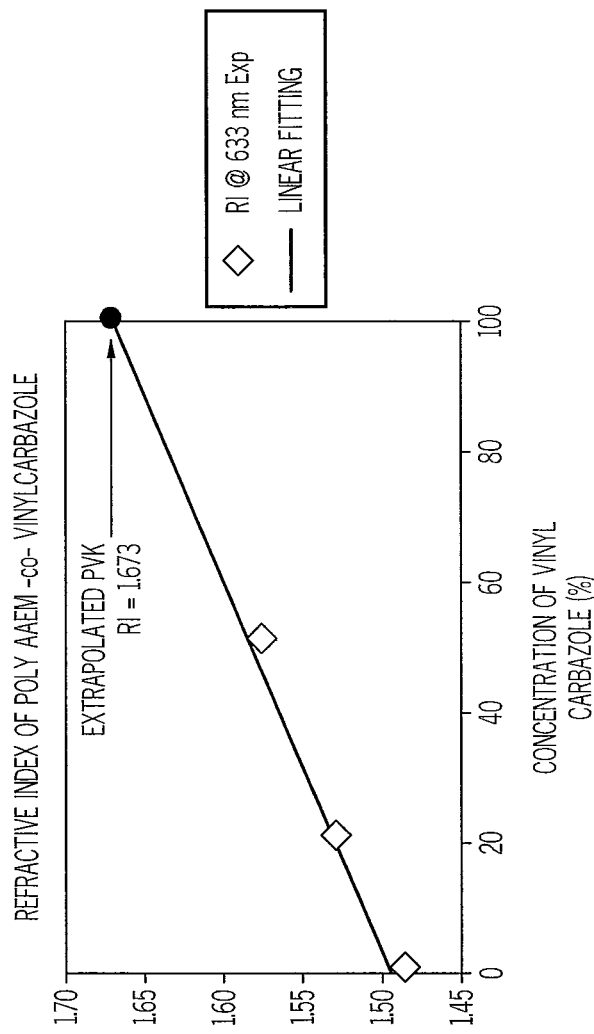
FIG. 1 is a graph illustrating the effect of the vinyl carbazole (VC) concentration (horizontal scale) on the refractive index (vertical scale) of the resulting copolymer of 2-(methacryloyloxy)ethyl 3-oxobutanoate (AAEM) and VC as prepared in Example 7.

Broadly, the present invention provides for processable compositions useful in modifying light transmittance and/or absorbance, and methods of making and using the compositions.

In one embodiment, the present invention meets the need to produce processable high refractive index compositions that form transparent coatings. In another embodiment, it also meets the objective of producing highly effective ultraviolet light absorptive compositions that can provide protection over the UV spectrum to about 350 nm or even to about 400 nm. Both qualities are useful for lens materials, in making anti-reflective coatings, paints, and/or packaging.

In general, high refractive index compositions that are useful in making anti-reflective coatings must have a refractive index of about 1.4 or higher and are capable of forming thick transparent coatings. Compositions that are useful for lens materials typically have refractive index values of about 1.8 or higher.

The ability to form a good thick transparent coating demonstrates that the composition possesses a good coating processability, which is one objective of this invention and which is also a criterion for lens material applications. Moreover, thick coatings enable one to better examine the refractive index and the transparency of a coating. As such, in the examples described below, to produce a processable high refractive index composition coating, a cast coating method was the preferred coating method because it produces thick coatings. Only when the cast coating method was unable to produce an acceptable end product was a spin coating method used. However, this discussion does not mean to limit the invention to thick coatings; the thickness of the coatings typically depends on the needs of each particular application. For example, lens materials require thick coatings while thin coatings are acceptable to anti-reflective coating applications.

Other coating process variables were also examined to reduce processing time and to form better coatings, such as coating temperatures and types of heating ovens. Three types of ovens were examined in this application: vacuum ovens, convection ovens, and microwave ovens.

On the other hand, to be useful in making paints and packaging materials, it is also desirable that compositions are capable of absorbing ultraviolet (UV) light over the range of wavelengths in the UV spectrum from about 290 nm to about 350 nm, or even to about 400 nm. In addition, an effective UV absorptive quality is a desirable quality for these high refractive index materials that are useful for lens materials and in making anti-reflective coatings. The present invention provides high refractive index compositions that also impart one or more of the above desired qualities, which make the compositions more economically desirable.

In the present application, the term "reaction product" refers to physical and/or chemical interactions between chemical compounds, such as complexing, chemical reaction, polymerization, co-polymerization, sol-gel condensation, interpenetration, and the like. Similarly, the term "reaction" refers to physical and/or chemical interaction between chemical compounds.

The term "the second compound with high refractive index" refers to the second compound with a refractive index of 1.4 or higher.

The term "high refractive index composition" refers to the composition of the present invention with a refractive index of 1.6 or higher. As shown below, the high refractive index composition is a reaction product of the second compound with high refractive index and the first organic compound. In some embodiments, it is presently believed that the reaction (physical and/or chemical) between the first organic compound and the second compound is able to provide a resulting composition with a higher refractive index than that of the second compound.

The term "interpenetrating composition" refers to an interpenetrating polymer network (IPN), which is a combination of two or more polymers in network forms, at least one of which is synthesized and/or crosslinked in the immediate presence of the other. IPN includes a blend of two polymers that are mixed and subsequently crosslinked. The interpenetrating portion of the network can be as little as 0.01%.

The phrase "useful in modifying light transmittance" refers to the ability to produce a film or coating that allows the transmission of the light at certain wavelengths.

The phrase "useful in modifying light absorbance" refers to the ability to produce a composition that can absorb light at certain wavelengths, such as UV lights.

A. High Refractive Index Compositions

Broadly, the present invention provides for a high refractive index composition, comprising a reaction product of (1) one or more first organic compounds capable of undergoing free radical, ionic, anionic/cationic dipolar addition or condensation polymerization; and (2) one or more second compounds with high refractive index, wherein the second compound is capable of undergoing polymerization and/or sol-gel condensation.

While not wishing to be bound by theory, it is presently believed that the second compound provides the high refractive index for the composition, while the first organic compound polymerizes and/or complexes with the second compound to form the compositions. That is, the first organic compound provides better mechanical and processing qualities for the compositions without unduly reducing, or maybe even increasing, their high refractive index, which is mostly provided by the second compound.

Preferably, the first organic compound comprises organic compounds with functional groups comprising —OH, —NH₂, —CHO, —C=O, —COOH, —NCO, -epoxy, -vinyl, -acrylic, -acyl, -alkyl, -halide, -amino, -ketone, -allyl, -thiol, -isocyanate, -styrenic, or mixtures thereof. Unlimited examples of a functional group for the first organic compound that is capable of undergoing condensation reaction are carboxylic, amino, hydroxyl, thiol, isocyanate, epoxy, halide, and mixtures thereof.

According to some embodiments, the first organic compound comprises an acrylate compound, a diketonate compound of structure 1, or a mixture thereof;
wherein the diketonate compound of structure 1 comprises

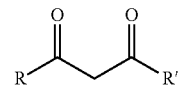

wherein R or R'=H, an alkyl group having up to 12 carbons, an acrylic group, a carboxylic group, a vinyl group, a ketone group, an allyl group, or a mixture thereof. Unlimited examples of the diketonate compound of structure 1 are 4,6- dioxoheptanoic acid, 5,7-dioxooctanoic acid, allyl 2-acetylacetoacetate, allyl 2-acetyl-3-oxobutanoate, and a mixture thereof.

More preferably, the first organic compound is 2-(methacryloyloxy)ethyl 3-oxobutanoate, which has the structure below:

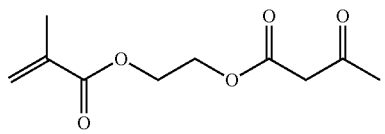

While not wishing to be bound by theory, it is presently believed that the acrylate might provide more flexibility and improve processability of the resulting composition. Preferably, the acrylate comprises siliconized urethane acrylate (Sartomer), butyl acrylate, or a mixture thereof.

Alternatively, the acrylate or acrylic compound can be treated as a crosslinking agent to strengthen the resulting composition, and to generate more robust composition coatings or films. Unlimited examples are trimethylolpropane triacrylate (TMP triacrylate), pentaerythretol tetra-acrylate, glycerol triacrylate, polyethylene glycol diacrylate, other acrylic crosslinking agent, and a mixture thereof.

According to some embodiments, the second compound comprises
a. an organic compound (1) obtained by coupling two reactive groups (a) and (b), wherein
    i. the reactive group (a) is (a) is Y—(CH$_2$)n-M(O—R)$_3$, wherein R is CH$_3$, C$_2$H$_5$, C$_3$H$_8$, C$_4$H$_{10}$; and Y is —NH$_2$, —COOH, —NCO, or epoxy; and wherein M is selected from the group consisting of Ti, Zr, V, Mg, Al, Mn, Sb, Ba, Ca, Ce, Si, and Sn; and
    ii. the reactive group (b) is selected from the group consisting of carbazole, fluorene, imidazole with one or more functional groups selected from —OH, —NH$_2$, —COOH, —NCO, -epoxy, -vinyl, -acrylic, -acyl, -alkyl, -halide, -amino, -ketone, -allyl, -allylic, -thiol, -isocyanate, and a mixture thereof;
b. an organic compound (2) comprising carbazole, fluorene, imidazole, diketonate, or a mixture thereof;
c. an optional metal alkoxide; and
d. a mixture thereof.

The organic compound (1) is a ultra-violet light (UV) absorptive compound that is useful in making lens materials, paints and packaging, with or without the first organic compound. Preferably, the reactive group (a) is 3-(triethoxysilyl) propyl isocyanate, and the reactive group (b) is 2-(9H-carbazole-9-yl)ethanol.

Figure 2A:
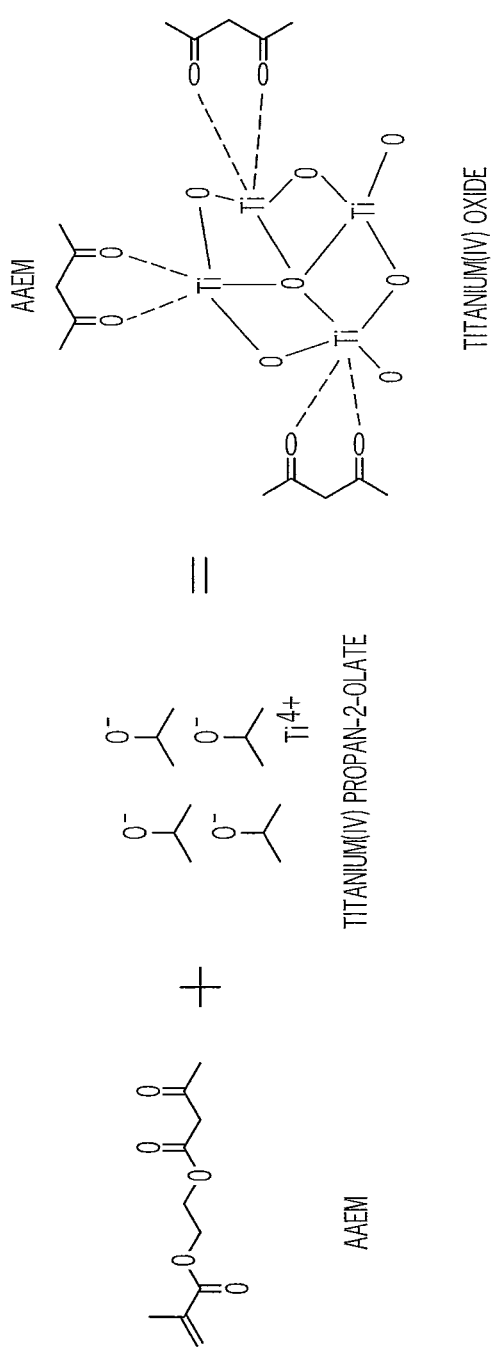
FIG. 2A is a flow chart illustrating a method for producing a composition in which a titanium alkoxide transforms to a titanium oxide to complex with AAEM to form an AAEM-Titanium oxide complex, including chemical structures associated with starting materials and the final product.
Figure 2B:
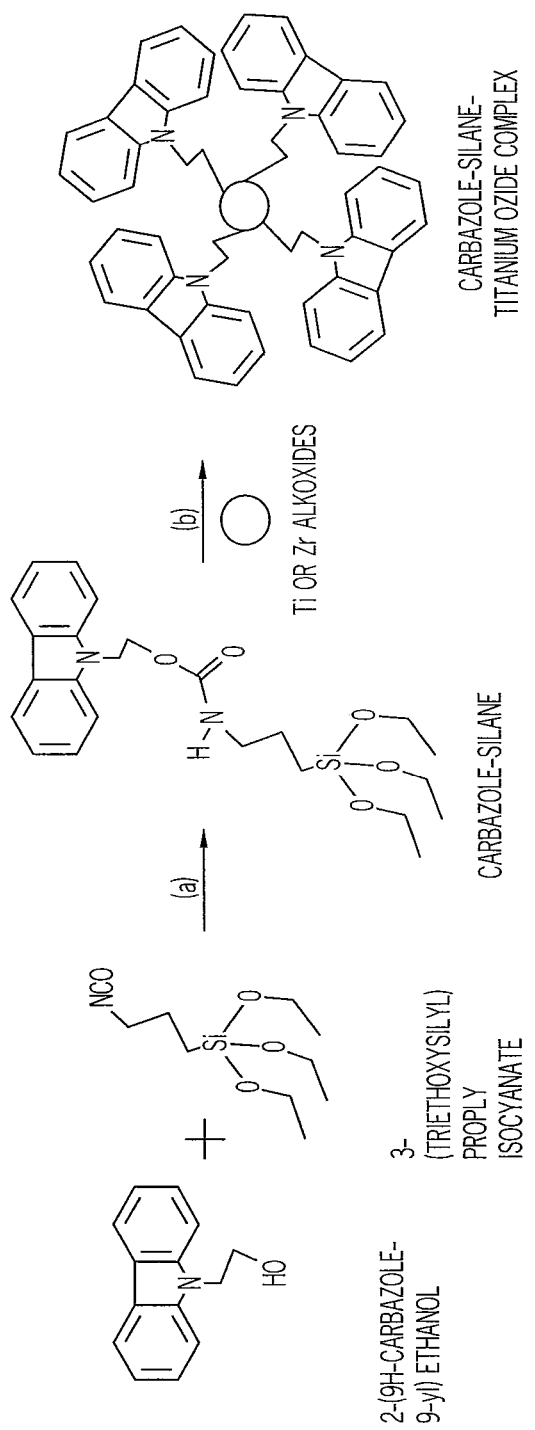
FIG. 2B is a flow chart illustrating a method for producing a carbazole modified silane composition in which (a) 2-(9H-carbazol-9-yl)ethanol reacts with 3-(Triethoxysilyl) propyl isocyanate to form a carbazole modified silane (also called silane modified carbazole), and then (b) the resulting carbazole modified silane is coupled to titanium alkoxide to form a carbazole-silane-titanium oxide complex, including chemical structures associated with starting materials, intermediates, and final product.

The method of making or producing the organic compound (1) using the preferred reactive groups (a) and (b) is illustrated in step a of FIG. 2B, in which 2-(9H-carbazol-9-yl) couples to 3-(triethoxylsilyl)propyl isocyanate to produce this organically modified compound or composition. Example 10A shows a preferred method of making a preferred embodiment of the organic compound (1), which is a silane modified carbazole (also called carbazole modified silane). This modified carbazole has a long chain of silane backbone which enhances the carbazole's ability to complex and react with the first organic compound, while at the same time, generating a composition that has a combination of a high refractive index and UV absorptive capability. That is, the silane backbone improves the compatibility of the carbazole to complex with the first organic compound and/or with other second compound(s) to produce the desired composition of the present invention.

Preferably, the organic compound (2) comprises one or more functional groups comprising —OH, —NH$_2$, —CHO, —C=O, —COOH, —NCO, -epoxy, -vinyl, -acrylic, -acyl, -alkyl, -halide, -amino, -ketone, -allyl, -thiol, -isocyanate, or mixtures thereof. More preferably, the organic compound (2) comprises carbazole, vinyl carbazole, the diketonate compound of structure 2, the diketonate compound of structure 3, or a mixture thereof.

According to some preferred embodiments, the organic compound (2) comprises a compound A, a compound B, a compound C, or a mixture thereof; wherein
a. the compound A comprises

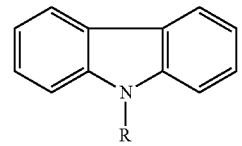

wherein R is —H,

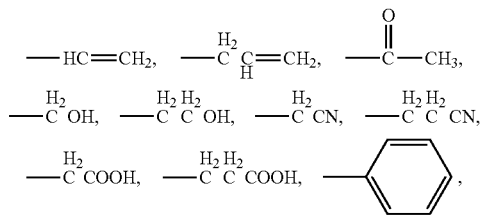

or a mixture thereof;
b. the compound B comprises

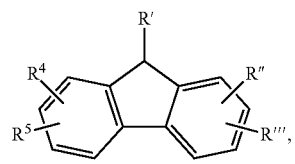

wherein R' is —H, —OH, —CHO, —C=O, or —COOH; R" is —H, —F, —OH, NH$_2$, —COOH, -acyl, -allyl, -ketone, -isocyanate; and R''' is —NH$_2$, or -the compound A; R$^4$ is —H, —F, —OH, NH$_2$, —COOH, -acyl, -allyl, -ketone, -isocyanate; and R$^5$ is —NH$_2$, or -the compound A; and
c. the compound C comprises

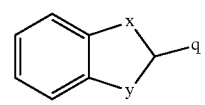

where x is —S, —N, or —O; y is —N or —C; and q is

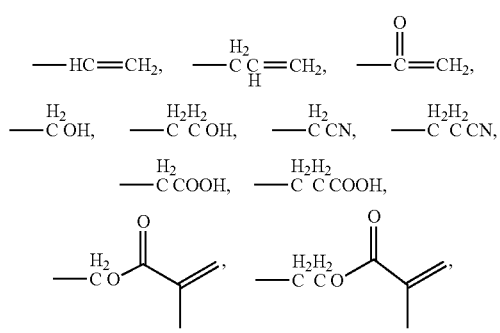

or a mixture thereof.

The diketonate compound of the structure 2 is

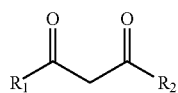

wherein $R_1$ and/or $R_2$=an aromatic ring, a poly-aromatic ring, or a mixture thereof; and The diketonate compound of the structure 3 is

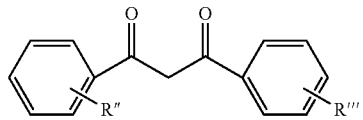

wherein R″ and/or R‴=H, an aromatic ring, a poly-aromatic ring, a carboxylic group, an vinyl group, a halide group, a ketone group, an allyl group, or a mixture thereof. The diketonate compounds of structures 2 and 3 differ from the diketonate compound of structure 1: Structures 2 and 3 have at least one aromatic ring and have high refractive index.

Additional unlimited examples of the diketonate compound of structure 2 and structure 3 are 4-cyclopentene-1,3-dione, 2,2-dimethyl-4-cyclopenten-1,3-dione, 2-allyl-2-methyl-1,3-cyclopentanedione, 2-allyl-cyclohexane-1,3-dione, 4,5-dichloro-4-cyclopentene-1,3-dione, 2-diazo-5,5-dimethyl-1,3-cyclohexanedione, 3-(3-methyl-2-buten-1-yl)-1,2,4-cyclopentanetrione, 4,4-difluoro-1-phenyl-1,3-butanedione, 3-(phenylazo)-2,4-pentanedione, 5-(4-fluorophenyl)-1,3-cyclohexanedione, and the diketonates listed below:

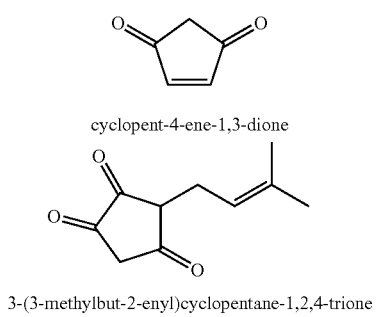

cyclopent-4-ene-1,3-dione 3-(3-methylbut-2-enyl)cyclopentane-1,2,4-trione

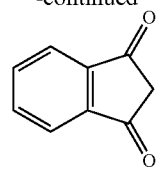

1H-indene-1,3(2H)-dione

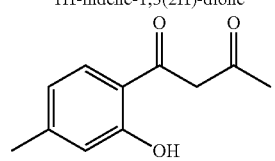

1-(2-hydroxy-4-methylphenyl)butane-1,3-dione

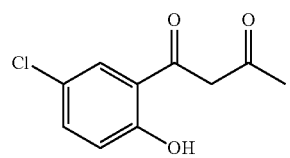

1-(5-chloro-2-hydroxyphenyl)butane-1,3-dione

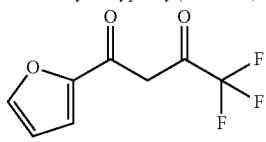

4,4,4-trifluoro-1-(furan-2-yl)butane-1,3-dione

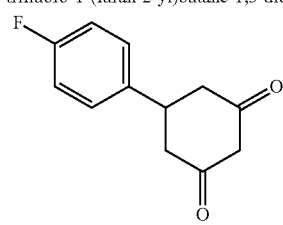

5-(4-fluorophenyl)cyclohexane-1,3-dione

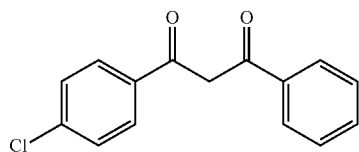

1-(4-chlorophenyl)3-phenylpropane-1,3-dione

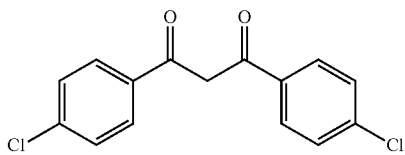

1,3-bis(4-chlorophenyl)propane-1,3-dione

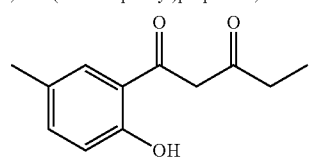

1-(2-hydroxy-5-methylphenyl)pentane-1,3-dione

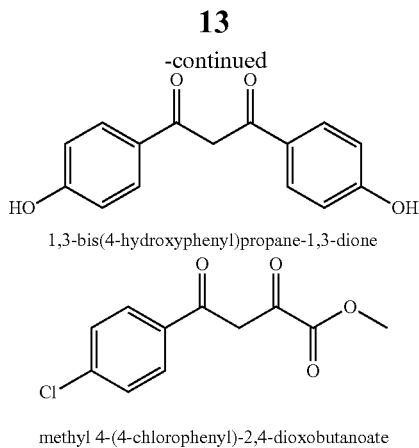

1,3-bis(4-hydroxyphenyl)propane-1,3-dione methyl 4-(4-chlorophenyl)-2,4-dioxobutanoate Typically, the diketonate compound with one or more aromatic rings or poly-aromatic rings have higher refractive index than that of the diketonate compound without any aromatic rings or poly-aromatic rings. While not wishing to be bound by theory, it is presently believed that the diketonate compound with aromatic or poly-aromatic ring(s) produces a composition with higher refractive index than that of the other diketonate compounds. For example, in Example 5, 1-(2-hydroxyphenyl)-3-phenylpropane-1,3-dione (HPPD) reacted and/or complexed with titanium isopropoxide to produce a composition with a refractive index of 2.2, while the composition based on AAEM and titanium isoproxide only had a refractive index of no more than about 1.8.

Additionally, the carbazole or carbazole derivative compounds that are suitable as the second compound include, but are not limited to, the following structures:

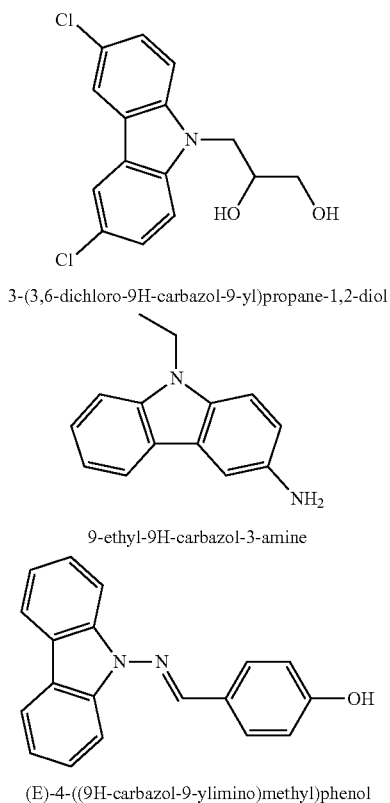

3-(3,6-dichloro-9H-carbazol-9-yl)propane-1,2-diol 9-ethyl-9H-carbazol-3-amine (E)-4-((9H-carbazol-9-ylimino)methyl)phenol

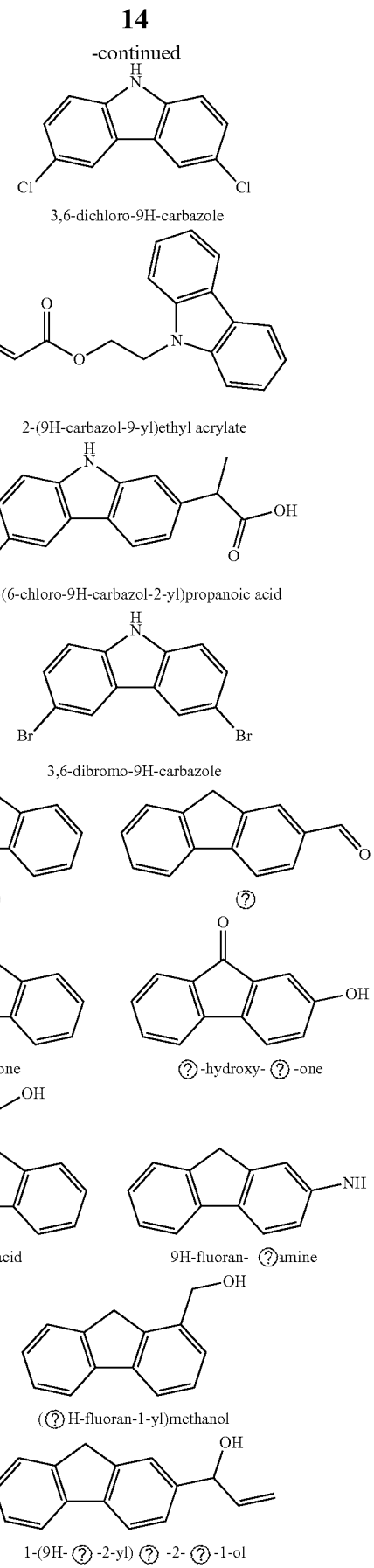

3,6-dichloro-9H-carbazole 2-(9H-carbazol-9-yl)ethyl acrylate 2-(6-chloro-9H-carbazol-2-yl)propanoic acid 3,6-dibromo-9H-carbazole (?) -one (?)-hydroxy- (?) -one (?) acid 9H-fluoran- (?)amine ((?)H-fluoran-1-yl)methanol 1-(9H- (?) -2-yl) (?) -2- (?) -1-ol

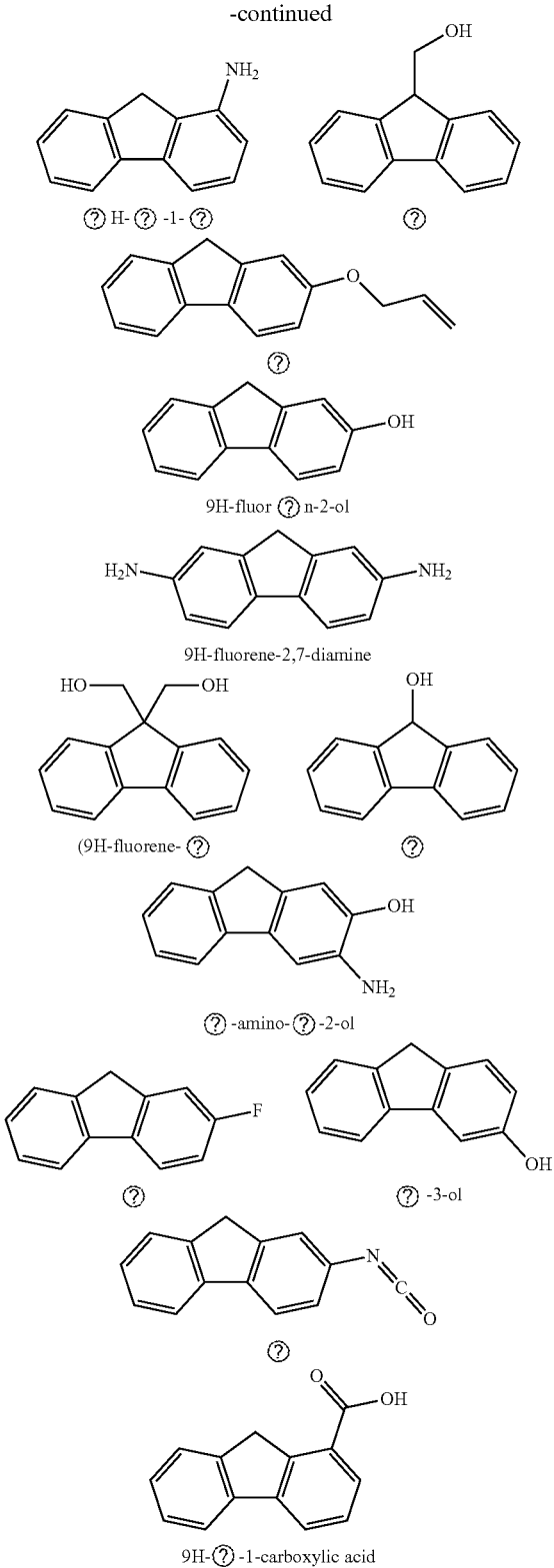

Preferably, the metal in the optional metal alkoxide is selected from the group consisting of Ti, Zr, V, Mg, Al, Mn, Sb, Ba, Ca, Ce, Si, and Sn. More preferably, the metal alkoxide is titanium alkoxide with a general formula of Ti(OR$_3$)$_4$ wherein R$_3$ is an alkyl group having up to 8 carbon atoms. Alternatively, the metal alkoxide is a zirconium alkoxide with a general formula of Zr(OR$_3$)$_4$, wherein R$_3$ is an alkyl group having up to 8 carbon atoms. While not wishing to be bound by theory, it is presently believed that metal alkoxide transforms to metal oxide nanocrystals to complex with the first organic compound and/or the second compound, preferably with AAEM (the first organic compound), to form a complex. This process is illustrated by FIG. 2A.

Moreover, it is presently believed that the first organic compound, such as AAEM, complexes with the metal oxide to inhibit the particle growth of the resulting metal oxide nanocrystals, while at the same time, the first organic compound does not inhibit or affect the crystal growth of the metal oxide nanocrystals. Accordingly, the first organic compound prevents the aggregation of the metal oxide nanocrystals during the coating process, resulting in good thick composition coatings.

A non-exhaustive list of the metal alkoxides includes aluminum tert-butoxide, aluminum ethoxide, aluminum isopropoxide, aluminum phenoxide, aluminum tributoxide, aluminum tri-sec-butoxide, diethylaluminum ethoxide, antimony (III) acetate, antimony(III) butoxide, antimony(III) ethoxide, antimony(III) isopropoxide, antimony(III) methoxide, antimony(III) propoxide, barium acetate, barium 2-ethylhexanoate, barium isopropoxide, barium tetrahydrofurfuryl oxide, calcium 2-ethylhexanoate, calcium isopropoxide, calcium methoxide, cerium(III) acetate hydrate, cerium(III) 2-ethylhexanoate, cobalt(II) acetate, cobalt(II) acetate tetrahydrate, cobalt(II) acetylacetonate 97%, cobalt(II) 2-ethylhexanoate, magnesium acetate tetrahydrate, magnesium ethoxide 98%, magnesium methoxide, manganese(II) acetate tetrahydrate, manganese(III) acetate dehydrate, dibutyldimethoxytin, tin(IV) acetate, tin(IV) tert-butoxide, tributyltin methoxide 97%, chlorotriisopropoxytitanium(IV), chlorotriisopropoxytitanium(IV), titanium(IV) butoxide, titanium(IV) tert-butoxide, titanium(IV) ethoxide, titanium (IV) 2-ethylhexyloxide, titanium(IV) isopropoxide, titanium (IV) methoxide, titanium(IV) propoxide, titanium(IV) tetrahydrofurfuryloxide, vanadium(V) oxytriethoxide, vanadium(V) oxytriisopropoxide, vanadium(V) oxytripropoxide, zinc acetate dehydrate, zinc trifluoroacetate hydrate, zirconium acetate, zirconium(IV) acetate hydroxide, zirconium(IV) butoxide, zirconium(IV) ethoxide, zirconium(IV) isopropoxide, zirconium(IV) propoxide, and a mixture thereof.

The present invention uses one or more first organic compounds and one or more second compounds to produce various embodiments of the high refractive index compositions. For example, the optional metal alkoxide reacts or complexes with another second compound (the diketonate of structure 2, the carbazole modified silane, or vinyl carbazole) to produce a co-polymer, which then reacts with the first organic compound (e.g. AAEM) to produce the composition. Alternatives, the first organic compound (AAEM) co-polymerizes with the second organic compound (vinyl carbazole), and then the resulting co-polymer complexes or reacts with the metal alkoxide to produce the composition. Further, another first organic compound, such as acrylate, can be added to the above embodiments, such as AAEM/vinyl carbazole/metal alkoxide mixture, to generate a more processable composition.

In some embodiments, the second compound includes metal alkoxide as the only component or as one of the components. Preferably, the first organic compound should be present in an amount suitable to produce a metal oxide crystal with molecular weight by number average in a range of about 2,000 to about 300,000. More preferably, the first organic compound (such as diketonate of structure 1) is present in the resulting composition at about 1 wt % or above (see Example 2). Alternatively, the second compound, such as vinyl carbazole, needs to be present at about 20 wt % or higher to produce the high refractive index composition of the present invention.

The more preferred embodiments of the compositions of the present invention include the reaction products of the following specific components:

1. One first organic compound and one second compound, with AAEM and vinyl carbazole being more preferred; and the AAEM and carbazole modified silane being the most preferred.
2. One first organic compound, and two second compounds, which include metal alkoxide and one other second compound. The first organic compound is preferably AAEM, but it can also be an acrylate, such as Sartomer or butyl acrylate. The second compound other than metal alkoxide can be vinyl carbazole or carbazole modified silane, with carbazole modified silane being more preferred.
3. One first organic compound, and three second compounds, which include metal alkoxide and two other second compounds. The first organic compound is preferably AAEM, but it can also be an acrylate, such as Sartomer or butyl acrylate. The two second compounds other than metal alkoxide can be vinyl carbazole and carbazole modified silane.
4. Two first organic compounds, and two second compounds, which include metal alkoxide and one other second compound. The first organic compounds are preferably AAEM and an acrylate, such as Sartomer. The other second compound can be vinyl carbazole or carbazole modified silane, with carbazole modified silane being more preferred.
5. Two first organic compounds, and three second compounds, which include metal alkoxide and two other second compounds. The first organic compounds are preferably AAEM and an acrylate, such as Sartomer. The other second compound can be vinyl carbazole and carbazole modified silane.

The composition of the present invention is useful in modifying light transmittance and/or light absorbance. When the first organic compound is diketonate compound of structure 1, the resulting composition is useful in modifying both light transmittance and absorbance. However, when the resulting composition does not contain any diketonate compound, it might only be capable of modifying light absorbance. For example, the reaction product (composition) of the first organic compound being an acrylate, the metal alkoxide, and n-vinyl carbazole is an opaque coating with only ultra-violet light absorption capability (see Example 9).

The present invention also provides a method of producing the compositions described above, comprising the following steps:

a. mixing at least one first organic compound capable of undergoing polymerization, at least one second compound with high refractive index that is capable of undergoing polymerization, an optional initiator, an optional catalyst, and an optional solvent;
b. forming the resulting mixture into a preproduct; and
c. reacting the preproduct at a temperature wherein the high refractive index composition is produced.

In step a, the first organic compound and the second compound are described in detail above. The optional initiator and catalyst and solvent will be described in more detail later.

Step b is describing the process of applying the mixtures of step a on suitable substrates, and thus producing a preproduct. The preproduct is then cured. Curing the preproduct includes reacting the preproduct at a temperature wherein the first organic compound couples or reacts with the second compound to form the composition. When the second compound includes a metal alkoxide, the metal alkoxide couples to the first organic compound, and then the metal alkoxide transforms to metal oxide nanocrystals wherein the composition is produced. In other words, step c is another way of describing the process of curing the preproduct.

In addition to chemical changes during the curing process, the curing also refers to driving away substantially all of the remainder of the solvent from the resultant composition solution to produce a tack-free coating or film (defined as a cured film coating). In the present invention, the resultant mixture was generally "cured" using one or more of the following techniques: (a) thermal; (b) radical or ionic; (c) photochemical; and (d) microwave irradiation.

Typically, the preproduct of step b is cured using a thermal process, which is typically performed at a specified temperature in a vacuum oven for a period of time. The preferred temperature range in step c is about 40° C. to about 120° C. However, a convection oven can also be used as illustrated by Example 4. When the second compound includes metal alkoxide, the temperature in the curing step is preferably at a level where it enables substantial crystallization of metal oxide nanocrystals. Optimal temperatures for substantial crystallization of metal oxide nanocrystals are in the range of about 100° C. to about 300° C.

A drastically shorter curing time can be achieved by using a microwave oven. While it typically takes many hours in a regular oven to cure a preproduct to a composition, it only takes minutes for the microwave oven to produce acceptable and good composition. In the case of metal alkoxide, a microwave oven enables faster crystallization of metal oxide nanocrystals. This process is also called a sol-gel condensation process.

The metal alkoxides are precursors that are soluble in organic solvents, which are called SOL; the resulting metal oxide nanocrystals are obtained by gelling the SOL precursors using a suitable method (Gel method). Therefore, the process of the metal alkoxide solution transforming into metal oxide nanocrystals is typically called the sol-gel condensation.

During this sol-gel process, the precursor (metal alkoxide, for example) undergoes hydrolysis and polycondensation reactions to form a network of compositions, which acts like a network "elastic solid." This network is a system composed of discrete submicrometer particles dispersed to various degrees in a host fluid, which is then removed through a drying process (curing). The formation of a metal oxide network involves connecting the metal centers with oxo (M-O-M) or hydroxo (M-OH-M) bridges, therefore generating metal-oxo or metal hydroxo polymers in the solution. Thus, the sol evolves towards the formation of a gel-like diphasic system containing both a liquid phase and solid phase whose morphologies range from discrete particles to continuous polymer networks. The liquid (solvent) is then removed through a drying process, which is typically accompanied by a significant amount of shrinkage and densification. This sol-gel method can mix and uniformly distribute even small quantities of chemicals through sol in the final product, the composition.

While not wishing to be bound by theory, it is presently believed that the first organic compound, for example the diketonate compound of structure 1 (AAEM), complexes with the metal oxide to inhibit the particle growth of the resulting metal oxide nanocrystals, while at the same time, the first organic compound does not inhibit or affect the crystal growth of the metal oxide nanocrystals. Therefore, the first organic compound prevents the aggregation of the metal oxide nanocrystals during the formation of the composition film or coating, which results in good thick composition coatings.

If there is a second compound other than metal alkoxide is added the mixture of step a in the method of making the composition, the second compound is believed to polymerizes with the first organic compound first to form a copolymer, and then the optional metal alkoxide transforms to metal oxide nanocrystals to complex with the copolymer wherein the composition is formed. Preferably, the copolymer is present in an amount suitable to produce a metal oxide crystal with a molecular weight by number average in a range of about 2,000 to about 300,000. The first organic compound in the copolymer still prevents the aggregation of the metal oxide nanocrystals by inhibiting the particle growth but not affecting the crystal growth of the metal oxide nanocrystals. More importantly, the copolymer that is more effective in preventing the aggregation of the metal oxide nanocrystals during the coating process. Accordingly, the resulting compositions have high refractive indices and the capability to form more robust film coatings.

The optional solvent, thus, is needed in the sol-gel process, which is one of the polymerization method used to produce the compositions of the present invention. The solvent can be an organic solvent, an aqueous solvent, or a mixture thereof. The organic solvent can be toluene, ethanol, 2-propanol, tetrahydrofuran, other organic solvents into which the first organic compound can readily dissolve, or a mixture thereof. When the AAEM is the first organic compound, ethanol is the preferred solvent. The aqueous solvent, which is also referred to as a hydrolyzation agent, is preferably deionized water, water, or other similar aqueous solution, with the deionized water being the most preferred. Preferably, the deionized water is present in an amount suitable to form the composition network, which is preferably in the range of about 0.05 wt % to about 0.5 wt %.

The optional catalyst is added to assist or accelerate the polymerization and/or co-polymerization of the first organic compound and/or the second compound during the formation of the composition. The catalyst includes an organic catalyst, an inorganic catalyst, an organometallic catalyst, or a mixture thereof. Preferably, the organic catalyst is acetic acid, acrylic acid, formic acid, butyric acid, lactic acid, or a mixture thereof. The inorganic catalyst is preferably strong acids, such as nitric acid, sulfuric acid, hydrochloric acid, with the nitric acid being more preferred. An example of the preferred organometallic catalyst is dibutyltin dilaurate.

The optional initiator can be added to the mixture of step a to improve the processability of the resulting composition. The initiator is preferably a radical initiator, a photo initiator, or a mixture thereof.

The radical initiator comprises azo compounds, alkyl peroxides, redox initiators, and mixtures thereof. Unlimited examples of the azo compound are azobisisobutylonitrile (AIBN), 1,1'-azobis(cyclohexanecarbonitrile) (ABCN), n-acetyl N'-a-cyanoethyl diimide, 2-cyano-2-propyl-azo-formamide, 2-(carbamoylazo)isobutyronitrile, n-acetyl n'-α-cyanocyclopentyl-diimide, 2,2'-azo-bis-isobutyronitrile, 2,2'-azo-bis-2-methylpropionitrile, 3,6-dicyano-3,6-dimethyl-1,2-diazacyclohexene-1,2,2'-azo-bis[2-(hydroxymethyl)-propionitrile, 4-nitrophenyl-azo-2-methyl-2-propionitrile, phenyl-azo-2-methyl-2-propionitrile, 4-methoxphenyl-azo-2-(methylpropanedinitrile), 2,2'-azo-bis-2-cyclopropyl-propionitrile, 2,2'-azo-bis-2,4-dimethyl-valeronitrile, n-(l-Cyanocyclohexyl)-pentamethyleneketenimine, 4,4'-azo-bis(4-cyanopentanoyl)bis-2-(2-aminoethoxy)ethanol, 4,4'-azo-bis-(4-cyanopentanyl)-bis(heptadecafluorododecanoate) and mixtures thereof.

Unlimited examples of the redox initiator are iron chloride, ammonium persulfate, N,N'-tetramethyl ethylene diamine (TEMED), and mixtures thereof.

Unlimited examples of the alkyl peroxide are methyl peroxide, ethyl peroxide, 2,4-pentanedione peroxide, propyl peroxide, isopropyl peroxide, allyl tert-butylperoxide, dimethylaminomethyl tert-butyl peroxide, tert-butyl peroxide, tert-butyl 2-chloro-1,1-dimethylethyl-peroxide, sec-butyl peroxide, bromo-tert-butyl peroxide, chloro-tert-butyl peroxide, bis(chloro-tert-butyl) peroxide, 2-tert-butyl peroxy-2-methyl-1-propanol, 1-hydroxybutyl-n-butyl peroxide, tert-amyl peroxide, cumyl peroxide, bicyclo[2.2.2]octane-1-formyl peroxide, a,a'-bis(tert-butylperoxy)-diisopropyl benzene, 2,5-dimethyl-2,5-di-(2-ethyl-hexanoylperoxy)hexane, acyl peroxides, acetyl peroxide, propionyl peroxide, 2-iodopropionyl peroxide, perfluoropropionyl peroxide, 2,2,3,3-tetrafluoropropionyl peroxide, tert-butyl permaleic acid, butyryl peroxide, isobutyryl peroxide, cyclopropane formyl peroxide, diacetyl succinoyl diperoxide, succinoyl peroxide, acetyl benzoyl peroxide, cyclopropane acetyl peroxide, benzoyl isobutyryl peroxide, cyclopentane formyl peroxide, benzoyl peroxide, lauroyl peroxide, aliphatic polymeric diacyl peroxide, hydroperoxide, ketone peroxide, sec-butyl hydroperoxide, tert-butyl hydroperoxide, tert-butyl hydroperoxide/cobalt 2-Ethyl hexanoate, methyl ethyl ketone peroxide, tert-amyl hydroperoxide, acetone cyclic diperoxide, cyclohexyl hydroperoxide, benzyl hydroperoxide, cumyl hydroperoxide, p-cymene hydroperoxide, decalin hydroperoxide, perester, peroxycarbonate, deimethyl peroxalate, tert-Butyl percarbamate, tert-butyl performate, isobutyl peracetate, n-butyl peracetate, sec-butyl peracetate, tert-Butyl peracetate, diethyl peroxydicarbonate, tert-butyl cyclopropane-percarboxylate, tert-butyl heptafluoroperoxy-butyrate, tert-butyl perbenzoate, tert-butyl peroctoate, cumyl perpropionate, and mixtures thereof.

Unlimited examples of photo initiators include 2,2-dimethoxy-1,2-diphenylethan-1-one (Irgacure 651™), benzophenone, 2,2-diethoxyacetophenone, diethoxyphenylacetophenone, 1-hydroxycyclohexyl phenyl ketone (IRGACURE 184™), 2-methyl-1-[4-(methylthio)phenyl]-2-morpholinopropanone-(1IRGACURE 907™), 2,2-dichlorophenoxyacetophenone (SANDORAY 1000™), 2-hydroxy 2-methyl 1-phenyl propanone (DAROCURE 1173™), mixed triaryl sulfonium hexafluorophosphate salts (CYRACURE UVI-6990™), and mixtures thereof.

AIBN is the more preferred initiator.

According to some alternative embodiments, the present invention provides for a composition, which comprises an organic compound obtained by coupling two reactive groups (a) and (b), wherein
  i. the reactive group (a) is (a) is Y—$(CH_2)$n-M$(O—R)_3$, wherein R is $CH_3$, $C_2H_5$, $C_3H_8$, $C_4H_{10}$; and Y is —$NH_2$, —COOH, —NCO, or epoxy; and wherein M is selected from the group consisting of Ti, Zr, V, Mg, Al, Mn, Sb, Ba, Ca, Ce, Si, and Sn; and
  ii. the reactive group (b) is selected from the group consisting of carbazole, fluorene, imidazole with one or more functional groups selected from —OH, —$NH_2$, —COOH, —NCO, -epoxy, -vinyl, -acrylic, -acyl, -alkyl, -halide, -amino, -ketone, -allyl, -allylic, -thiol, -isocyanate, and a mixture thereof.

The composition is a ultra-violet light (UV) absorptive compound that is useful in making lens materials, paints and packaging. Preferably, the reactive group (a) is 3-(triethoxysilyl)propyl isocyanate, and the reactive group (b) is 2-(9H-carbazole-9-yl)ethanol. The organic compound in this embodiment is the same of as the organic compound (1) mentioned above.

The present invention provides a method for producing this composition, which comprises (1) providing the reactive group (a) and the reactive group (b); (2) adding the reactive group (a) to the reactive group (b); and (3) reacting the mixture at a temperature wherein the composition is produced.

The method of making or producing the organic compound (1) using the preferred reactive groups (a) and (b) is illustrated in step a of FIG. 2B, in which 2-(9H-carbazol-9-yl) couples to 3-(triethoxylsilyl)propyl isocyanate to produce this organically modified compound or composition. Example 10A shows a preferred method of making a preferred embodiment of the organic compound, which is a silane modified carbazole (also called carbazole modified silane). This modified carbazole has a long chain of silane backbone which enhances the carbazole's ability to complex and react with the first organic compound or a resin, while at the same time, generating a composition that has a high refractive index and UV absorptive capability. That is, the silane backbone improves the compatibility of the carbazole to complex with the first organic compound and/or with other second compound(s) to produce the desired composition of the present invention.

The composition with only this organic compound has a high refractive index value of above 1.6. Further, this organic compound can be produced in both liquid and powder form, as shown by Examples 10B and 10C.

According to some embodiments, the present invention provides a method for using all of the above compositions for coating solar panels, photovoltaic devices, wind turbines, UV light resistant coatings and paints, packaging materials, anti-reflective coatings, or mixtures thereof.

For example, the organic compound (1) can be mixed with polymers to produce UV absorptive packaging materials that are capable of absorbing UV light up to 350 nm, or even to 400 nm. The polymers are preferably polyethylene (PE), polyethylene terephthalate (PET), or a mixture thereof. Unlimited examples of the polymers are acrylic, alkyl, epoxy, styrenic, polyolefins, alkyd, polyimide, polyester, polyamide, polyazole, polyurethane, and a mixture thereof. The ratio between the organic compound and the polymer can be adjusted to produce the UV absorptive polymer or polymer coating capable of absorbing UV light to about 350 nm, and even to 400 nm. While not wishing to be bound by theory, it is presently believed that due to a slight structural incompatibility, a slightly lower loading of the organic compound produced a polymer composition with an ability to absorb higher wavelengths of UV lights (such as to about 400 nm) than that of the polymer composition with a higher loading.

In other words, in these applications, the final product, such as packaging material, can be produced in situa by introducing one or more polymers to the components of the compositions. Many of these polymers are not polymerizable and are generally not reactive with the first organic compound and the second high refractive compound. In some cases, the polymer can enhance the compatibility between the first organic compound and the second compound. It is believed that the polymers can enhance the compatibility by forming organic/organic interpenetrating compositions or organic/inorganic composition complexes or interpenetrating compositions. Unlimited examples of the preferred polymers are alkyl acrylates, methacrylates, alkyl acrylic and methacrylic acids, acrylamides, vinyl ethers, vinyl pyrrolidones, vinyl pyridines, vinyl imidazole styrenes, polyacrylates, polycarbonates, polystyrenes, polyolefins, polyurethanes, siloxanes, polysulfones, polyketones, polyimidazoles, and mixtures thereof.

B. High Refractive Index Compositions With Silicone Materials

The high refractive index compositions described in section A can be combined with silicone materials to increase the refractive index values and the light transmittance and/or absorption of the silicone material.

In the present application, "silicone" can be used interchangeably with "siloxane." "Silicone resin" can also be used interchangeably with "silicone polymer." Silicone is often referred to as poly-siloxane, but can include other chemical elements. Typically, these silicone materials consist of an inorganic silicon-oxygen backbone ( ... —Si—O—Si—O—Si—O— ... ) with organic side groups attached to the silicon atoms, which are four-coordinate. In some cases organic side groups can be used to link two or more of these —Si—O— backbones together. By varying the —Si—O— chain lengths, side groups, and crosslinking, silicones can be synthesized with a wide variety of properties and compositions. They can vary in consistency from liquid to gel to rubber to hard plastic. The most common silicone material is linear polydimethylsiloxane (PDMS), a silicone oil. The second largest group of silicone materials is based on silicone resins, which are formed by branched and cage-like oligosiloxanes.

A broad embodiment for the interpenetrating composition include a reaction product of (1) one or more first organic compounds capable of undergoing free radical, ionic, anionic/cationic dipolar addition or condensation polymerization; (2) one or more second compounds with high refractive index, wherein the second compound is capable of undergoing polymerization and/or sol-gel condensation; and (3) one or more silicone resins. That is, the silicone resin can be combined with either the first organic compound or the second compound, or be combined with both the first organic compound and the second compound. While not wishing to be bound by theory, it is presently believed that the first organic compound and/or the second compound interact with the silicone resin in a way to form an interpenetrating composition. In other words, the silicone resin matrices interpenetrate with the matrices or polymers or co-polymers of the first organic compound and/or the second compound.

Preferably, the silicone resins comprise one or more high viscosity resins, one or more low viscosity silicone resins, or a mixture thereof.

The first organic compound and the second compound are described in detail above.

The high viscosity silicone resin comprises one or more poly (aryl alkyl silicone) resin with viscosities equal to or above 10,000 cSt. The low viscosity silicone resin comprises one or more poly (aryl alkyl silicone) resins with viscosities less than 10,000 cSt. Preferably, the first high viscosity silicone resin is SCR 1011-B, and the second high viscosity silicone resin is SCR 1011-B. More preferably, the low viscosity silicone resin comprises one or more poly (alkyl aryl siloxanes) with a terminal functional group selected from vinyl, silanol, hydride, amine, carboxylic, azide, or a mixture thereof.

Unlimited examples of the low viscosity silicone resin include compound D, and compound E, wherein compound D comprises

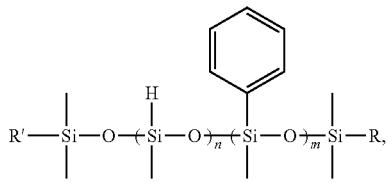

wherein R and R'=—H, -vinyl, -silanol, -amine, -carboxylic, -azide, or mixtures thereof; n=1 to 100; m=1 to 100; wherein a ratio between n and m is in a range of 20 wt % to 80 wt % and Compound E comprises

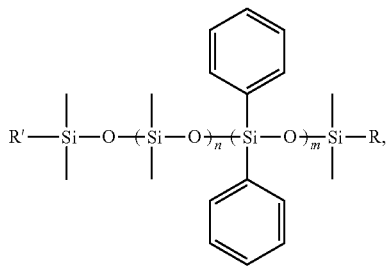

wherein R and R'=—H, -vinyl, -silanol, -amine, -carboxylic, -azide, or mixtures thereof; n=1 to 100; m=1 to 100, wherein a ratio between n and m is in a range of 20 wt % to 80 wt %.

According to some embodiments, preferred mixtures of the low viscosity resin and the second compound are able to achieve a balanced combination of high refractive index and high light transmittance at specific wavelengths: (1) the low viscosity silicone resin is a silanol terminated poly (alkyl aryl siloxanes), and the second compound comprises 9-vinyl-9H-carbazole; (2) the low viscosity silicone resin is a carboxy terminated poly (alky aryl siloxanes), and the second compound comprises 2-(9H-carbazol-9-yl)ethanol); and (3) the low viscosity silicone resin is a vinyl terminated poly (alky aryl siloxanes).

According to some embodiments, the present invention provides a reaction product of a high viscosity silicone resin; a low viscosity silicone resin; and the optional metal alkoxide, with or without the first organic compound and/or the second compound.

Preferably, the high viscosity silicone resin is present in the range of about 1 wt % to about 70 wt %; the low viscosity silicone resin is present in the range of about 0 wt % to about 40 wt %; and the metal alkoxide is present in the range of about 0 wt % to about 40 wt %; wherein the total amount of the high viscosity silicone resin, the low viscosity silicone resin, and the metal alkoxide remains about 100 wt %.

Preferably, the low viscosity silicone group is present in the range of 1 wt % to about 40 wt %, and the metal alkoxide is present in the range about 1 wt % to about 40 wt %.

According to some more preferred embodiments, the second compound is a carbazole modified silane, vinyl carbazole, a metal alkoxide, or a mixture thereof, with the mixture of carbazole modified silane/vinyl carbazole/metal alkoxide being more preferred. The carbazole modified silane is combined with one or more resins, preferably the low viscosity resin, to form a silicone backbone of the resin composition. Vinyl carbazole and the metal alkoxide both increase the refractive index value of the final resin composition. The increase in the refractive index value of the composition enables the composition to be more compatible with the substrate with very high refractive index, and thus increases the capability of the substrate, such as lens materials or anti-reflecting coatings. The first organic compound, as exemplified by AAEM, enables the second compound to be more compatible with the resin, preferably the low viscosity resin, resulting in a better quality resin film.

According to some alternative embodiments, the present invention provides a method for making the above compositions, which comprises (a) mixing at least one second compound and/or at least one first organic compound with one or more low viscosity silicone resins; (b) mixing one or more high viscosity silicone resins with the mixture of step a; (c) forming the mixture of step b into a preproduct; and (d) reacting the preproduct at a temperature wherein the metal alkoxide transforms to metal oxide nanocrystals wherein the composition is produced.

Further, the method includes an optional catalyst, an optional solvent/co-solvent, and a hydrolyzation agent (also called an aqueous solvent), all of which are described in detail in section A. The co-solvent and the solvent can be the same or different. Preferably, the solvent comprises 1-butanol, toluene, or other similar aromatic hydrocarbons. The co-solvent comprises polaraprotic compounds, such as N-methyl-2-pyrrolidone, N,N-dimethyl acetamide, or a mixture thereof.

According to some embodiments of the composition, one or more optional metal alkoxides are used. The sol-gel condensation method as described in section A can be used to introduce metal oxide nanocrystals into silicone polymer matrices. The composition is obtained by mixing the metal alkoxide, with or without the first organic compound and/or another second compound, with one or more high viscosity silicone resins followed by coating the mixtures on suitable substrates to form a preproduct, and then curing the preproduct using one or combinations of following techniques: (1) thermal; (b) radical or ionic; (c) photochemical; and (d) microwave irradiation, with the thermal process being the preferred one.

More specifically, the method includes (1) mixing a first high viscosity silicone resin with the metal alkoxide, without or without the first organic compound and/or another second compound, (b) adding a second high viscosity silicone resin to step (a) mixture; (c) forming the mixture of step (b) into a preproduct; and (c) reacting the preproduct at a temperature wherein the composition is produced. The first high viscosity silicone resin and the second high viscosity silicone resin can be the same or different.

According to some alternative embodiments, the present invention provides a composition, which comprises a reaction product of an organic compound with fused aromatic and spiro functional groups, wherein the organic compound is capable of reacting with epoxy groups; and a silicone polymer with one or more functional groups selected from -epoxy, isocyanate, or a mixture thereof.

According to some other alternative embodiments, the present invention uses the above high refractive index compositions to make an anti-reflective coating. The method comprises applying layers of varying refractive index values onto a substrate. Preferably, the layers of varying refractive index values comprise a first layer with high refractive index value of about 1.6 or above and a second layer with lower refractive index value of about 1.4, wherein the first layer is applied onto the substrate and the second layer is applied onto the first layer.

The first layer and the second layer can include the composition of the same chemical components but with different concentrations. Alternatively, the first and second layer can include compositions of different chemical components. For example, both layers can comprise a reaction product of a high refractive index compound containing one or more diketonate of structure 1 (the first organic compound); vinylcarbazole or carbazole modified silane (the second compound); a metal alkoxide (another second compound); and a silicone polymer. Preferably, the substrate is a silicone resin.

C. Examples

The present invention is further illustrated by the following examples which are illustrative of some embodiments of the invention and are not intended to limit the scope of the invention in any way:

Definitions

1. Types of Ovens Used in the Present Invention:
   All of the following examples used the following vacuum oven, convection oven, and microwave oven:
   a. The convection oven used is a 754 watt Fischer Scientific Isotemp oven, model 518G.
   b. The vacuum oven used is a 550 watt VWR vacuum oven, model 1410, with an attached Welch mechanical oil pump, model 1402.
   c. The microwave oven used is a Samsun model MW 1150 WA, 1.55K Watt standard kitchen microwave oven.
2. The Coating Methods Used in the Present Invention:
   a. A cast coating method: (1) the resultant solution was poured in a Teflon® mold, (2) heated at 60° C. for two hours (or 40° C. for two hours or for 2-3 days as specified in Example 4 for samples IV-1 & IV-2 in Table 2B) in the convection oven to drive off a majority portion of the solvent, and then (3) cured at 120° C. (or other specified time) for two hours in the vacuum oven (or other specified time if using the microwave oven).
      i. Note: Step (2) is used for formulations containing metal alkoxide. Formulations without metal alkoxide do not have this step (2). For example, Example 7 only has step (3) process.
      ii. Moreover, in step (3), the curing temperature can be other than 120° C., which is specified in the following example(s), and the curing time can also be other than two hours when the microwave oven is used instead of the vacuum oven.
   b. A spin coating method: the resultant solution was spin coated on a quartz/Si wafer and then heated to 120° C. (or other temperature as specified in the following examples) for two hours in the vacuum oven.
   c. A solution cast method: the resultant solution was solution coated on a quartz substrate, then cured at room temperature for 24 hours.
3. The film quality of a coating:
   a. A good film coating is defined as a coating with a smooth transparent continuous film.
   b. A bad film coating is defined as a coating with only film fragments and without any continuous film.
   c. A film coating with a low film quality is defined as a coating with continuous films but an uneven film surface.
4. In addition to all the chemical changes during a curing process, "curing" also refers to driving away all of the remainder of the solvent from a resultant composition solution to produce a tack-free coating (defined as a cured film coating). For example, in the cast coating method, step (2) drives off a majority of the solvent using the convection oven, while step (3) drives off the remainder of the solvent using the vacuum oven, which resulted in a cured film. In the present invention, the resultant solution was generally "cured" at a specified temperature in the vacuum oven. However, curing might happen when the resultant solution was left in the convection oven for a long period of time as shown in example 4 (see Table 2B-IV-B-cured).
5. Procedure for measuring refractive index: After a sample was coated on a quartz, a refractive index measurement was made at room temperature using a Metricon Prism Coupler Model 2010/M equipped with a lower power He—Ne laser (0.8 mw nominal) and a 200-P-3 prism capable of measuring refractive index values less than 2.0. The Metricon Prism Coupler would automatically display a figure of effective refractive index values vs. reflectance, measure and display the refractive index value at the knee of the figure. In some examples, when the knee of a figure displayed by Metricon was not obvious, a visual estimate of a refractive index by an experienced operator was used.

Example 1

Control

This example illustrates a Ti Sol/Gel control.
The following materials were used: ethanol 104 g, deionized water (DI water) 1.8 g, nitric acid ($HNO_3$) 0.2 mL, Ti(i-OPr)$_4$ 14 g.

Procedure:
The ethanol, deionized water, and nitric acid were mixed in a 250 ml beaker and stirred well for five minutes on a stir plate with a magnetic stir bar. Then, a specified amount of Ti(i-OPr)$_4$ was added to the mixture within two minutes and stirring was stopped immediately thereafter.

A part of the resultant solution was spin coated on a quartz/Si wafer and then heated to 120° C. for two hours in the vacuum oven.

Another part of the resultant solution was poured in a Teflon® mold, heated at 60° C. for two hours in the convection oven, and then cured at 120° C. or 300° C. as specified in Table 1B for two hours in the vacuum oven.

The formulation details are given in Table 1A (Scheme I Control) and the film formation conditions, cast versus spin coating and heat-treatment temperature varied from sample to sample as shown in the data summary table (Table 1B)

Discussion:
This example acts like a control for Examples 2-3. Scheme I in Table 1B shows that titanium oxide, by itself, produces a film coating with a high refractive index of about 1.8 or above. However, the quality of the resulting film coating was poor: No continuous film coating was obtained, and only barely enough film fragments were obtained to measure the refractive index of the pure titanium oxide composition.

The addition of AAEM to titanium alkoxide was expected to produce a composition with better coating process capabilities; however, the resulting composition might have a lower refraction index than that of a composition with only titanium oxide (the control). Examples 2 and 3 examined the effect of AAEM on the refractive index of the composition of AAEM and Titanium oxide. More specifically, Example 2 explored different concentrations of AAEM on the refractive index and the processability of the final composition. Example 3 evaluated the effect of a radical initiator and higher temperature during the polymerization process on the refractive index and the process capability of the resulting composition.

Example 2

This example illustrates the preparation of a Ti Sol/Gel stabilized with various concentrations of acetoacetoxyethyl methacrylate (AAEM).

The following materials were used: ethanol 100 g; deionized water 1.8 g; nitric acid (HNO$_3$) 0.2 mL; Ti(i-OPr)$_4$ 14 g; and various concentrations of AAEM as shown in Table IA (0.5 g, 1 g, 2 g, and 4 g).

Procedure:

The ethanol, AAEM, deionized water, and nitric acid were mixed in a 250 mL beaker and stirred well for five minutes on a stir plate with a magnetic stir bar. Then, the Ti(i-OPr)$_4$ was added to the mixture within two minutes and stirring was stopped immediately thereafter.

A part of the resultant solution was spin coated on a quartz/Si wafer and then heated to 150° C. for two hours in the vacuum oven.

Another part of the resultant solution was poured in a Teflon® mold, heated at 60° C. for two hours in the convection oven, and then cured at 120° C. (or other temperatures as specified in Table 1B) for two hours in the vacuum oven.

The formulation details are given in Table 1A (Scheme II 1-4) and the film formation conditions, cast versus spin coating and heat-treatment temperature varied from sample to sample as shown in the data summary table (Table 1B).

Discussion:

Table 1B shows that a ratio of 2/14 wt % (about 14 wt %) AAEM/Ti(i-OPr)$_4$ resulted in a composition that gave a relative high refractive index of 1.73-1.81 and a good film formation by using the spin coating method, although no continuous film was produced by the cast coating method. A ratio of 4/14 wt % AAEM/Ti(i-OPr)$_4$ (about 29 wt %) produced a composition that gave a slightly lower high refractive index of 1.63-1.73 but a better thick film formation through the cast method.

The lower ratios of 0.5/14 wt % (about 3 wt %) and 1/14 wt % (about 6 wt %) of AAEM/Ti(i-OPr)$_4$ (Schemes II-1 and II-2) were able to produce acceptable films through the spin coating method, at least for the first layer of the film, although no continuous coatings were achieved by the cast method. While not wishing to be bound by theory, it is presently believed that a ratio of 1 wt % of AAEM/Ti(i-OPr)$_4$ or above can produce acceptable thin films with high refractive index values. Therefore, for applications that accept thin film coatings, such as for lens materials, the AAEM can be presented in the AAEM/Ti(i-OPr)$_4$ system in a ratio of about 1 wt % or above to produce acceptable thin films with high refractive index values.

However, for applications that require a thicker coating, such as anti-reflective coatings, the AAEM might need to be presented in about 14 wt % or above in order to produce acceptable thick film coatings by the cast method with high refractive index values.

In conclusion, the ratios of 2/14 wt % (about 14 wt %) and 4/14 wt % (about 29 wt %) AAEM/Ti(i-OPr)$_4$ produced high refractive index materials with more robust film coatings. Therefore, these two ratios were used for further studies to achieve composition materials with higher refractive index values while retaining robust coating capabilities.

Example 3

This example illustrates the effect of radical initiation and temperature during the coating process on a Ti Sol/Gel stabilized with AAEM.

The following materials were used: Ethanol 100 g; deionized water 1.8 g; nitric acid (HNO$_3$) 5 drops; Ti(i-OPr)$_4$ 14 g; and AAEM 2 g and 2,2'-azobisisobutyronitrile (AIBN) 0.014 g.

Procedure:

The ethanol, AAEM, AIBN, deionized water, and nitric acid were mixed in a 250 mL beaker and stirred well for five minutes on a stir plate with a magnetic stir bar. Then, the Ti(i-OPr)$_4$ was added to the mixture within two minutes and stirring was stopped immediately thereafter.

The resultant solution was poured in a Teflon® mold, heated at 60° C. for two hours in a convection oven, and then cured at 120° C. (or other temperatures as specified in Table 1B) for two hours in a vacuum oven.

The formulation details are given in Table 1A (Scheme III) and the film formation conditions, cast versus spin coating and heat-treatment temperature varied from sample to sample as shown in the data summary table (Table 1B).

Discussion:

According to the results of Scheme III in Table 1B, good thick continuous film coatings with high refractive index values of 1.65 and 1.75 were obtained by the cast method for two samples of Example 3 with a curing temperature of either 60° C. or 150° C. Comparing the results of Scheme III to that of Scheme II-3, it is found that the addition of an initiator, azobisisobutylonitrile (AIBN), enabled the mixture of 2 g AAEM and 14 g titanium alkoxide to produce a composition with good thick films by the cast method, while without AIBN (Scheme II-3), the formulation produced no acceptable films by the cast method. However, the addition of AIBN reduced the refractive index of the resulting composition from 1.74-1.81 (Scheme II-3) to 1.65-1.75 (Scheme III).

Scheme III in Table 1B also shows that a higher temperature of 150° C. produced a composition with a higher refractive index of 1.750 when compared to a composition produced at 60° C., which had a lower refractive index of 1.650. While not wishing to be bound by theory, it is presently believed that a higher temperature in the range of about 100° C. to about 300° C. enables substantial crystallization of metal oxide nanocrystals, which results in compositions with higher refractive index values.

Therefore, it is desirable to use a radical initiator at a higher temperature of 150° C. to produce a better and thicker transparent film with refractive index values at about 1.50 or above, which is useful in making anti-reflective coatings.

TABLE 1A

Formulations for AAEM/TiO2 composite films by sol-gel thermal process
Formulation

| Example 1 Scheme I - Control | Scheme II-1 | Scheme II-2 | Scheme II-3 | Scheme II-4 | Example 3 Scheme III |
|---|---|---|---|---|---|
| Ethanol 104 g | Ethanol 100 g | Ethanol 100 g | Ethanol 100 g | Ethanol 100 g | Ethanol 100 g |
| DI water 1.8 g | DI water 1.8 g | DI water 1.8 g | DI water 1.8 g | DI water 1.8 g | DI water 1.8 g |
| HNO$_3$ 5 drops | HNO$_3$ 5 drops | HNO$_3$ 5 drops | HNO$_3$ 5 drops | HNO$_3$ 5 drops | HNO$_3$ 5 drops |

TABLE 1A-continued

Formulations for AAEM/TiO2 composite films by sol-gel thermal process

| | Formulation | | | | |
|---|---|---|---|---|---|
| Example 1 Scheme I - Control | Example 2 | | | | Example 3 |
| | Scheme II-1 | Scheme II-2 | Scheme II-3 | Scheme II-4 | Scheme III |
| Ti(i-OPr)$_4$ 14 g | Ti(i-OPr)$_4$ 14 g AAEM 0.5 g | Ti(i-OPr)$_4$ 14 g AAEM 1 g | Ti(i-OPr)$_4$ 14 g AAEM 2 g | Ti(i-OPr)$_4$ 14 g AAEM 4 g | Ti(i-OPr)$_4$ 14 g AAEM 2 g AIBN/or suitable initiator 0.014 g |

TABLE 1B

Effect of Process Conditions on Resultant Properties for the Schemes of Table 1A

| | Sample | Ratio of AAEM/Ti(OPr)$_4$ (wt % in g/g) | Vacuum Oven Temp (° C.) | Refractive Index @ 633 nm | Film Quality* |
|---|---|---|---|---|---|
| Example 1 | Scheme I Control (cast) | 0/14 | 120 | 1.800 | Bad film coatings (only obtained film fragments) |
| | Scheme I Control (cast) | 0/14 | 300 | 1.940 | Bad coating |
| Example 2 | Scheme II-1 (Cast) | 0.5/14 | 150 | 1.784 | Bad film coatings(only obtained film fragments for testing) |
| | Scheme II-1 (Spin Coating 400 rpm 3 layers) | 0.5/14 | 150 | 1.872 | The first layer of the film was good. The quality of the resulting film with 3 layers was low. |
| | Scheme II-2 (Spin Coating 400 rpm, 3 layers) | 1/14 | 150 | 1.810 | The first layer of the film was good. The quality of the resulting film with 3 layers was low. |
| | Scheme II-3 (Spin Coating 200 rpm, 1 layer) | 2/14 | 150 | 1.807 | Good film coatings. |
| | Scheme II-3 (Spin Coating 300 rpm, 1 layer) | 2/14 | 150 | 1.738 | 1.738 (good film coatings) |
| | Scheme II-4 (Cast) | 4/14 | 60 | 1.630 | 1.630 (good film coatings) |
| | Scheme II-4 (Cast) | 4/14 | 150 | 1.650 | 1.650 (good film coatings) |
| | Scheme II-4 (Cast) | 4/14 | 200 | 1.730 | 1.730 (good film coatings) |
| Example 3 | Scheme III (Cast) | 2/14 | 60 | 1.650 | 1.650 (good film coatings) |
| | Scheme III (Cast) | 2/14 | 150 | 1.750 | 1.750 (good film coatings) |

*See the definition section.

Example 4

This example illustrates the effect of photo initiator, crosslinking agent, and temperature on the preparation of a Ti Sol/Gel stabilized with AAEM. Photo initiation after composition formation was used. Cured samples were compared with uncured samples to evaluate the effect of a curing temperature using the cast method on TiO$_2$ crystallinity and the film formation.

The following materials were used: ethanol 100 g; deionized water 1.8 g; nitric acid (HNO$_3$) 0.2 mL; Ti(i-OPr)$_4$ 14 g; AAEM 4 g; trimethylolpropane triacrylate (TMP triacrylate) 0.4 g; Hydroquinone (HQ) 0.01 g; and 2,2-dimethoxy-1,2-diphenylethan-1-one (Irgacure 651™) 0.02 g.

Procedure:

The ethanol (solvent), AAEM, HQ (oxygen inhibitor), Irgacure 651™ (UV/photo initiator), TMP triacrylate (crosslinking agent), deionized (DI) water (hydrolyzation agent), and nitric acid (catalyst) were mixed in a 250 mL beaker and stirred well for five minutes on a stir plate with a magnetic stir bar. Then the Ti(i-OPr)$_4$ was added to the mixture within two minutes and stirring was stopped immediately thereafter.

The resultant solution used the cast coating method. Good film formations were obtained for all samples using the cast coating method, so the spin coating method was not used.

The formulation details are given in Table 2A (Scheme IV) and the film formation conditions, cast versus spin coating and heat-treatment temperature varied from sample to sample as shown in the data summary table (Table 2B).

TABLE 2A

Formulations for AAEM/TiO2 composite films by sol-gel photo process
Formulation
Scheme IV Ethanol 100 g
DI water 1.8 g
HNO3 5 drops
Ti(i-OPr)$_4$ 14 g
AAEM 4 g
TMP triacrylate 0.4
HQ 0.01 g
Irgacure 651 ™ 0.02 grams

TABLE 2B

Effect of Process Conditions on Resultant Properties for the Formulation of Table 2A

| Sample | Ratio of AAEM/Ti(OPr)4 | Film Formation Temperature | Refractive Index @ 633 nm |
|---|---|---|---|
| Scheme IV-1 Uncured (Cast) | 4/14 | 40° C. in the convection oven for two hours | 1.606* |
| Scheme IV-2 Cured (Cast) | 4/14 | 40° C. in the convection oven for 2-3 days | 1.616* |
| Scheme IV-3 Cured (Cast) | 4/14 | 60° C. in the convection oven for two hours followed by 150° C. in the vacuum oven for two hours | 1.697* |
| Scheme IV-4 Cured (Cast), A duplicate of Scheme IV-3 | 4/14 | 60° C. in the convection oven for two hours followed by 150° C. in the vacuum oven for two hours | 1.703* |

*Good film coatings were obtained for these formulations.

Discussion:

According to Table 2B, the addition of TMP triacrylate and a photo initiator enables the formation of transparent, thick and continuous films of the resulting AAEM/TiO$_2$ composite for both cured and uncured samples through the cast coating method. Compared with the refractive index of 1.750 of the AAEM/TiO$_2$ composite film prepared using only a radical initiator (see Table 1B, Scheme-II-4 at 150° C. (cast)), an AAEM/TiO$_2$ composite film prepared using both a photo initiator and a crosslinking agent (TMP triacrylate) had slightly lower refractive index values of 1.697 or 1.703 (Schemes IV-3 and IV-4). While not wishing to be bound by theory, it is presently believed that TMP triacrylate strengthens the AAEM polymers and the resulting composition, which results in more robust film coatings, while at the same time, it slightly reduces the refractive index of the AAEM/TiO$_2$ composite. Other crosslinking agents, such as pentaerythretol tetra-acrylate, glycerol triacryalte, polyethylene glycol diacrylate, and other acrylic crosslinking agents, can be used to achieve a balance of higher refractive index values and robust film coating processability.

Nevertheless, the compositions with this formulation are useful for anti-reflective coatings because they have relative high refractive index values of about 1.6 or above. However, these compositions might not be suitable for lens materials that typically have refractive index values of about 1.8 or higher.

Table 2B also shows that a higher curing (or film formation) temperature produced AAEM/TiO$_2$ composites with higher refractive index values (comparing the results of 40° C. samples to that of 150° C. samples). Curing in the convection oven (Table 2B, Scheme IV-2) at 40° C. for a long time, two to three days, resulted in a tack free (cured) sample but a lower refractive index value of 1.616. Although the refractive index of that sample is slightly higher than that of the sample (Table 2B, Scheme IV-1) that only underwent 40° C. for two hours, the refractive index is substantially lower than that of the samples that were cured at 150° C. in the vacuum oven (Table 2B, Schemes IV-3 to IV-4). Schemes IV-3 and IV-4, being duplicate samples, show that the AAEM/TiO$_2$ system cured at 150° C. in the vacuum oven can consistently produce a composition with high refractive index values of 1.697 or 1.703.

Therefore, it is clear that, for the AAEM/TiO$_2$ system, the film formation temperature is also critical in determining the refractive index of the formed films, in addition to the initiator and the crosslinking agent. While not wishing to be bound by theory, it is presently believed that a higher coating temperature in the range of about 100° C. to about 300° C. enables substantial crystallization of metal oxide nanocrystals, which results in composition with higher refractive index values.

Example 5

This example illustrates the preparation of a Ti Sol/Gel stabilized with (1-(2-hydroxyphenyl)-3-phenylpropane-1,3-dione) [HPPD] (a diketonate compound with one or more aromatic rings).

The following materials were used: ethanol 100 g; deionized water 1.8 g; nitric acid (HNO$_3$) 0.2 mL; Ti(i-OPr)$_4$ 14 g; and HPPD 0.3 g.

Procedure:

The ethanol, HPPD, deionized water, and nitric acid were mixed in a 250 mL beaker and stirred well for five minutes on a stir plate with a magnetic stir bar. Then the Ti(i-OPr)$_4$ was added to the mixture within two minutes and stirring was stopped immediately thereafter.

A part of the resultant solution was spin coated on a quartz/Si wafer and then heated to 150° C. for two hours in a vacuum oven.

The formulation details are given in Table 3 (Scheme II HPPD) and the film formation conditions, cast versus spin coating and heat-treatment temperature varied from sample to sample as shown in the data summary table (Table 3B).

TABLE 3A

Formulations and Comments for HPPD/TiO2 composite films by the sol-gel thermal process
Formulation

| Scheme II—HPPD | Comments-1 | Comments-2 |
|---|---|---|
| Ethanol 100 g DI water 1.8 g HNO3 5 drops Ti(i-OPr)$_4$ 14 g New Ligands 0.3 g | Poor solubility of New Ligands in ethanol set the limit for its use in the film formulation | Poor film surface quality resulted in low transmission and unreliable refractive index measurements |

TABLE 3B

Effect of Process Conditions on Resultant
Properties for the Formulation of Table 3A

| Samples | Ratio of AAEM/Ti(OPr)$_4$ | Vacuum oven Temperature (° C.) | Refractive Index @ 633 nm |
|---|---|---|---|
| Scheme II—New Ligands (Spin Coating 400 rpm) | 0.3/14 | 150 | 2.200 |

Discussion:

Due to the relative low solubility of the New Ligand, HPPD, in ethanol, the film quality is poor even with the spin coating method, which caused un-reliable refractive index measurement on this particular film, although the refractive index as measured is high (2.200).

While not wishing to be bound by theory, it is presently believed that should HPPD achieve a better solubility in other solvents, the resulting compositions might have better film qualities while maintaining high refractive index values of about 1.8 or higher, which are useful for lens materials. It is also presently believed that the aromatic ring in HPPD is the key functional structure that provides for high refractive index values of the resulting composition.

Unlimited examples of the solvents for HPPD, which might provide better solubility, include a ketone, such as acetone or methyl ethylketone; a polaroprotic solvent, such as N-methyl-2-pyrrolidone, N,N-dimethyl acetamide; or an aromatic hydrocarbon, such as toluene, zylene, p-chlorotrifluoromethyl benzene (Oxsol-100™).

Example 6

This example illustrates the preparation of a Zr Sol/Gel stabilized with acetoacetoxyethyl methacrylate (AAEM).

The following materials were used: ethanol 100 g; deionized water 1.8 g; nitric acid (HNO$_3$) 0.2 mL; Zr(i-OPr)$_4$ 14 g; and AAEM 4 g.

Procedure:

The ethanol, AAEM, deionized water, and nitric acid were mixed in a 250 mL beaker and stirred well for five minutes on a stir plate with a magnetic stir bar. Then the Zr(i-OPr)$_4$ was added to the mixture within two minutes and stirring was stopped immediately thereafter.

The resultant solution was poured in a Teflon® mold, heated at 60° C. for two (2) hours in a convection oven, and then cured at 150° C. for two hours in a vacuum oven.

Spin coating was not necessary in this example because thick transparent and continuous film coatings were obtained through the cast method.

The formulation details are given in Table 4A (Scheme II ZrO$_2$) and the film formation conditions, cast versus spin coating and heat-treatment temperature varied from sample to sample as shown in the data summary table (Table 4B).

TABLE 4A

Formulation for AAEM/ZrO$_2$ composite films by sol-gel thermal process
Formulation
Scheme II—ZrO$_2$ Ethanol 100 g
DI water 1.8 g
HNO3 5 drops
Zr(i-OPr)$_4$ 14 g
AAEM 4 g

TABLE 4B

Effect of Process Conditions on Resultant
Properties for the Formulation of Table 4A

| Sample | Ratio of AAEM/Zr(OPr)$_4$ | Vacuum Oven Temp (° C.) | Refractive Index @ 633 nm |
|---|---|---|---|
| Scheme II—ZrO$_2$ (Cast) | 4/14 | 150 | 1.623 |

Discussion:

The refractive index for bulk ZrO$_2$ crystals is about 2.0, which is also useful for developing high refractive index materials. Using the similar sol-gel thermal process for preparing AAEM/TiO$_2$ composite films, an AAEM/ZrO$_2$ composite film was prepared, and the results are summarized in Tables 4A and 4B. Compared with the refractive index of 1.650 of the AAEM/TiO$_2$ composite film (see Table 1B, Scheme-II-4 (cast)), an AAEM/ZrO$_2$ composite film prepared under the same conditions had lower refractive index values (1.62), which is consistent with the fact that crystalline TiO$_2$ has a higher refractive index of 2.4 than ZrO$_2$, which has a refractive index of 2.0.

In the aforementioned Examples 1-6, it was successfully demonstrated that AAEM/TiO$_2$ sol-gel thermal process is capable of developing high refractive index materials in particular for thin film samples. To further improve the processability of this approach while still producing high refractive index materials in bulk form, AAEM/vinyl carbazole and AAEM/vinyl carbazole/TiO$_2$ sol-gel thermal processes were tested in the following examples. These approaches take advantage of the copolymer of AAEM and vinyl carbazole to provide a balanced relative high refractive index and matrix flexibility. The results are given in Tables 5, 6A and 6B. It is clear that, for the AAEM/vinyl carbazole/TiO$_2$ system, the film formation temperature is also critical in determining the refractive index of the formed films.

Example 7

This example illustrates the preparation of film coating with a copolymer of the diketonate compound (AAEM) and a first organic compound capable of undergoing free radical, ionic, anionic/cationic dipolar addition or condensation polymerization (n-vinyl carbazole).

The following materials were used: AAEM, n-vinyl carbazole (VC) and AIBN, and toluene.

Procedure:

N-vinyl carbazole, toluene, and AIBN were dissolved in AAEM in a 250 mL beaker and stirred with a magnetic stirring bar for 2 hours.

The resulting solution was cast coated by pouring into a Teflon® mold and heat-treated in the vacuum oven at about 65° C.±10° C. for overnight (approximately 12-16 hours).

TABLE 5

Formulations for AAEM/VC composite films by the cast method Batch #1

|  | Example 13-1 Control | Example 13-2 80%/20% | Example 13-3 50%/50% |
|---|---|---|---|
| AAEM (g) | 8.6375 | 6.91 | 4.32875 |
| N-vinyl carbazole (g) | 0 | 1.7275 | 4.31875 |
| AIBN (g) | 0.0875 | 0.0875 | 0.0875 |
| Cast coating temperature (° C.) | 60 | 70 | 70 |

Discussion:

In this example, a good film formation by the cast coating method was obtained for the AAEM/VC composite with various concentrations of N-vinyl carbazole. The resulting film was pliable and had a rubber like consistency.

FIG. 1 is a graph illustrating the effect of the vinyl carbazole (VC) concentration (horizontal scale) versus the refractive index (vertical scale) of the resulting copolymer of 2-(methacryloyloxy)ethyl 3-oxobutanoate (AAEM) and VC as prepared in Example 7. FIG. 1 shows that the refractive index of the resulting film increases as the concentration of N-vinyl carbazole increases. The linear extrapolated refractive index value for the film made of almost 100% N-vinyl carbazole is 1.673.

FIG. 1 also shows that an 80/20 wt % AAEM/VC ratio produced high refractive index materials in bulk form while improving the processability of this approach. In other words, the VC needs to be present in about 20 wt % ratio or above to provide for a composition with a refractive index of 1.5 or above.

Example 8

This example illustrates the preparation of a Ti Sol/Gel stabilized with AAEM/vinyl carbazole (VC) and the effect of various concentrations of VC on the refractive index and the film formation quality of the resulting AAEM/VC compositions or the AAEM/VC/TiO$_2$ compositions. Radical initiation during curing was used.

The formulations are given in Table 6A; the process conditions and the results are given in Table 6B.

Procedure:

The ethanol, AAEM, VC, AIBN, deionized water, and nitric acid were mixed in a 250 mL beaker and stirred well for five minutes on a stir plate with a magnetic stir bar. Then Ti(i-OPr)$_4$ was added to the mixture within two minutes and stirring was stopped immediately thereafter.

Some samples' resultant solutions were (1) poured in a Teflon® mold and (2) heated at 60° C. overnight (~12 hours) in the convection oven, and then (3) cured at a specified temperature as listed in Table 6B for two hours in the vacuum oven. Note: step (3) was not used in several samples as shown in Table 6B: Formulations I-III and formulation IV-A used this cast coating method but did not use step (3). Formulation IV-B and formulation IV-C used step (3) with different temperatures.

Some samples' resultant solutions were (1) poured in a Teflon® mold, (2) heated at 60° C. overnight (~12 hours) in the convection oven, and then (3) cured in the microwave oven for specified periods as listed in Table 6B. Formulation IV-D used this microwave oven cast method.

The film formation conditions and heat-treatment temperature varied from sample to sample as shown in the data summary table (Table 6B).

TABLE 6A

Formulations for AAEM/vinylcarbazole/TiO$_2$ Composite Films by Sol-Gel Formulation

| Poly AAEM I | Poly AAEM/VC (50/50 ratio) II | Poly vinylcarbazole III | Poly AAEM/VC/TiO$_2$ IV |
|---|---|---|---|
| N - vinyl carbazole 0 g | N - vinyl carbazole 1.5 g | N - vinyl carbazole 3.0 g | N - vinyl carbazole 1.5 g |
| Ti-Isopropoxide 0 g | Ti-Isopropoxide 0 g | Ti-Isopropoxide 0 g | Ti-Isopropoxide 3 g |
| AIBN 0.019 g | AIBN 0.019 g | AIBN 0.019 g | AIBN 0.019 g |
| AAEM 3 g | AAEM 1.5 g | AAEM 0 g | AAEM 1.5 g |
| MEK 3 g | MEK 3 g | MEK 3 g | MEK 3 g |

TABLE 6B

Effect of Process Conditions on Resultant Properties for the Formulations of Table 6A

| Formulation | Samples | Ratio of (AAEM + VC)/Ti(OPr)$_4$ | Film Formation Conditions* | Refractive Index @ 633 nm |
|---|---|---|---|---|
| I | Poly AAEM (Cast) | NA | 60° C., Overnight | 1.485 |
| II | Poly AAEM/VC 50/50 (Cast) | NA | 60° C., Overnight | 1.600 |
| III | Poly Vinyl carbazole (Cast) | NA | 60° C., Overnight | 1.698 |
| IV | Poly AAEM/VC/TiO2 - A (Cast) | 3/3 | 60° C., Overnight | 1.670 |
|  | Poly AAEM/VC/TiO$_2$ - B (Cast) | 3/3 | 60° C., Overnight, Followed by 120° C. treatment | 1.693 |
|  | Poly AAEM/VC/TiO$_2$ - C (Cast) | 3/3 | 60° C., Overnight, Followed by 150° C. treatment | 1.715 |
|  | Poly AAEM/VC/TiO$_2$ - D-1 (Cast) | 3/3 | 60° C., Overnight, Followed by Microwave 6 min | 1.685 |

TABLE 6B-continued

Effect of Process Conditions on Resultant Properties for the Formulations of Table 6A

| Formulation | Samples | Ratio of (AAEM + VC)/Ti(OPr)$_4$ | Film Formation Conditions* | Refractive Index @ 633 nm |
|---|---|---|---|---|
| | Poly AAEM/VC/TiO$_2$ - D-2 (Cast) | 3/3 | 60° C., Overnight, Followed by Microwave 3 min | 1.686 |

*Film formulation conditions are listed as such: the 60° C., Overnight treatment was done in a convection oven (step (2) of the coating processes); while the 120° C., 150° C. treatment or the microwave was done following the 60° C. overnight treatment.

Discussion:

All formulations in Example 8 were able to produce thick transparent films using the cast coating method.

Table 6B shows that a higher temperature (150° C.) produced an AAEM/VC/TiO2 composition with a balanced higher refractive index and a good thick-film formation. In addition, compared with the 2 hours of curing time at 120° C. in the vacuum oven, the microwave oven reduced the curing time drastically to about 3-6 minutes. However, a longer microwave time (composite IV-1v. composite IV-2) shows no difference in the refractive index values of the composite.

Compared with the refractive index value of 1.698 for the vinyl carbazole only composition film, the addition of 50 wt % AAEM lowered the refractive index of the resulting AAEM/VC composite to about 1.600. However, the addition of titanium alkoxide to the vinyl carbazole/AAEM copolymer system provides for an AAEM/VC/TiO$_2$ composite with a higher refractive index of about 1.67.

Moreover, the results for samples IV-B and IV-C (Table 6B) show that increasing step (3) curing temperature to 150° C. from 120° C. resulted in a AAEM/VC/TiO$_2$ composition film with a higher refractive index of 1.715 (the 120° C. curing temperature resulted in a composition with a refractive index of 1.693). While not wishing to be bound by theory, it is presently believed that a higher temperature enables more substantial crystallization of titanium oxide nanocrystals, and that the microwave oven enables faster substantial crystallization of titanium nanocrystals, which achieved a balanced high refractive index and matrix flexibility.

Example 9

This example illustrates the preparation of a Ti Sol/Gel in the presence of Poly (N-vinyl carbazole) copolymer and butyl acrylates with or without AAEM.

Step A

In the first step poly (N-vinyl carbazole) copolymers (Table 7) were prepared by charging vinyl carbazole and a specified acrylate/AAEM (butyl acrylate, or AAEM), an initiator (AIBN) and a solvent (toluene) into a four neck 250 mL round bottom flask fitted with a mechanical stirrer, a condenser (with an inert gas outlet adapter), and a thermocouple adapter with a Teflon coated thermocouple and an addition funnel with an inert gas inlet adaptor. The reactants were heated to 60° C. with constant stirring and under an inert gas blanket. The reaction was carried out for 12 hours.

Step B

Poly(N-vinyl carbazole) copolymer obtained from step A was weighed in a vial containing a magnetic stir bar. Then the Ti(i-OPr)$_4$ was added within two minutes and the mixture was stirred at room temperature on a stir plate for five minutes.

The resultant solution was spin coated on a quartz plate and heated at 80° C. for 30 minutes in a convection oven.

The formulation details for making a Ti sol/gel in the presence of poly (N-vinyl carbazole) copolymer and their optical properties are given in Tables 7A, while the observations regarding the resulting composition films are listed in Table 7B.

TABLE 7A

Formulations for making poly(N-vinyl carbazole) copolymers according to step A

| | Polymerization Run (Charges in) | |
|---|---|---|
| | 1 | 2 |
| Composition | | |
| N-vinyl Carbazole | 968.2 mg | 4.9949 g |
| Butyl acrylate | 47.5 mg | 411.5 mg |
| AAEM | 45.7 mg | |
| AIBN | 1.7 mg | 3.2 mg |
| Toluene (mL) | 5 | 25 |
| Properties | | |
| Refractive Index | 1.6993 | 1.7097 |
| UV (% Transmissions, nm) | | |
| 350 | 0.3 | 0.3 |
| 400 | 85.2 | 78.9 |
| 450 | 87.8 | 83.9 |

TABLE 7B

Observations for the composition films

| Polymerization Run | Observation |
|---|---|
| 1 | This run resulted in a good thick transparent film with relative high refractive index of 1.6993. The film is clearer than that of Run 2. In addition, it was able to have good ultra-violet absorption up to 400 nm. |
| 2 | This run resulted in good thick films which were slightly less transparent than that of Run 1. It also can absorb ultra-violet light up to 400 nm. |

Discussion:

Run 2 shows that butyl acrylate, by itself, was not able to produce an acrylate/VC/TiO$_2$ composition with any transparent films. While not wishing to be bound by theory, it is presently believed that while butyl acrylate was able to provide flexibility to the composition, it was unable to stabilize titanium oxide nanocrystals to produce any transparent films. However, the composition film modified with butyl acrylate (Run 2), although slightly opaque, was capable of absorbing ultra-violet light up to 400 nm, which is useful in making paints and packaging materials. This refractive index composition film is clear enough to be useful in making anti-reflective coatings.

Moreover, the addition of butyl acrylate to the AAEM/VC/Titanium system resulted in a composition with a high enough refractive index (1.6993) with reasonably clear film coatings, which are useful for the anti-reflective coating application.

Example 10

This example illustrates the preparation of carbozole modified silane and the preparation of a Ti Sol/Gel in the presence of carbazole modified silane.

Step A: to Prepare Carbazole Modified Silane.

The silane containing carbazole was made in a 250 mL round bottom flask charged with 24.54 g of 2-(9H-carbazol-9-yl)ethanol and 100 mL of dimethylacetamide (DMAC). This mixture was left to dissolve while mixing with a stir bar over a period of 48 hours under inert atmosphere. To this solution, 30.23 g of 3-(Triethoxysilyl) propyl isocyanate was introduced drop wise over a period of 30 minutes and then heated for about 3 hours at 60° C. The reaction was continued until the disappearance of isocyanate peak as determined by Infrared spectroscopy.

Step B: to Produce a Composition in a Solution Format for the Purpose of Anti-Reflective Coating.

The solution obtained from step A (312.2 mg) was mixed with 194.1 mg of titanium isopropoxide. The resulting solution was spin coated on a glass plate and dried at 80° C. for 60 min. The refractive index was found to be 1.65.

Step C: to Produce a Composition in a Dry Powder Format that can be Used as an UV Absorption Additive for Uses Such as Paints and Packaging.

Please see Example 13 for UV absorption results of polyethylene or polyethylene terephthalate film modified with a carbazole-silane/TiO2 system.

17 g of step A solution was mixed with 6 g of titanium isopropoxide, and the resulting solution was poured into a beaker containing 41 g water and 8 g of acetic acid. The product was isolated by a conventional filtration method. The product obtained was a white powder.

Discussion:

A carbazole modified silane (carbazole-silane) solution was readily obtained by the method illustrated in step A. Mixing this carbazole modified silane with titanium alkoxide produced a composition with a high refractive index of 1.65, which is sufficiently high to be useful for anti-reflective coating purposes.

The mixture of carbazole modified silane and titanium oxide can be produced in a dry powder format (step C), which is useful in absorbing ultra-violet light to be used as a paint additive or for packaging purposes (see Example 13).

While not wishing to be bound by theory, it is presently believed that the reaction process proceeds as illustrated in FIG. 2B. FIG. 2B is a flow chart illustrating a method for producing a carbazole modified silane composition in which (a) 2-(9H-carbazol-9-yl)ethanol reacts with 3-(Triethoxysilyl) propyl isocyanate to form a carbazole modified silane, and then (b) the resulting carbazole modified silane is coupled to titanium alkoxide to form a carbazole-silane-titanium oxide complex, including chemical structures associated with starting materials, intermediates, and final product.

Example 11

This example illustrates use of carbazole modified silane obtained from Example 10A as a UV absorbing additive.

The solution obtained from example 10A (2.2 g) was added to 1.52 g of a 40 wt % water based acrylic modified polyurethane dispersion and stirred well using a Vortex dispersing device. The resultant product was solution coated on a glass plate and cured at room temperature for 24 hours.

Figure 3:
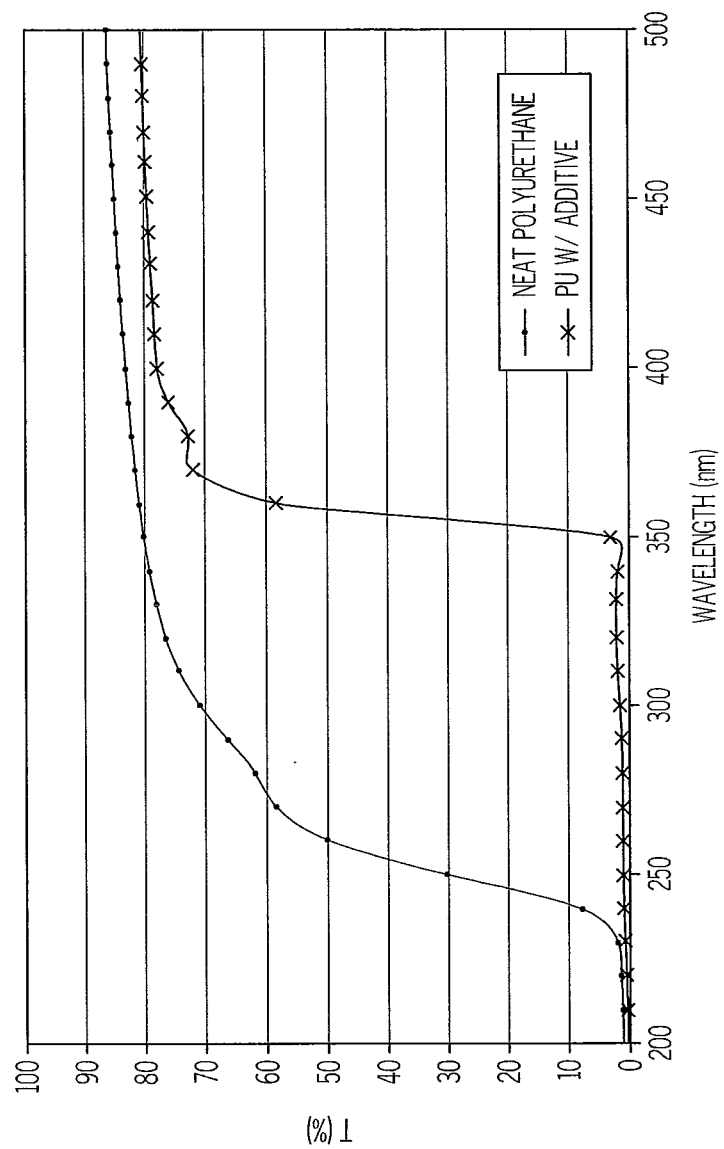
FIG. 3 is a graph illustrating ultra-violet (UV) visible spectrum vs. percent transmittance (% T) of the coatings described in Example 11. It compares the % T of the modified polyurethane coating (the present invention) at various wavelengths to that of the unmodified (neat) polyurethane coating to demonstrate the UV absorptive capability of the present invention.

The results for Example 11 are shown in FIG. 3. FIG. 3 is a graph illustrating ultra-violet (UV) visible spectrum vs. percent transmittance (% T) of the coatings described in Example 11. It compares the % T of the modified polyurethane coating (Example 11) at various wavelengths to that of the unmodified (neat) polyurethane coating (the control) to demonstrate the UV absorptive capability of the present invention.

Discussion:

The UV-visible spectrum of the coating (FIG. 3) shows that the coating containing the modified composition significantly absorbs UV when comparing to that of the control coating. In FIG. 3, the modified polyurethane (with added carbazole modified silane) coating absorbs UV light to about 350 nm while the coating with only polyurethane (the control) absorbs UV light only to about 250 nm.

Example 12

This example illustrates use of carbazole modified silane obtained from Example 10A as an UV absorbing additive.

The solution obtained from example 10 step A (3.5 g) was added to 6.5 g of a 40 wt % water based acrylic modified polyurethane dispersion and stirred well using a Flack tech particle dispersing device. The resultant product was coated on a glass plate using the solution cast method and cured at room temperature for 24 hours. The UV-visible spectrums of the coatings in FIG. 4 show that the coating containing the carbazole modified silane composition significantly absorbs UV compared to the control coating.

Figure 4:
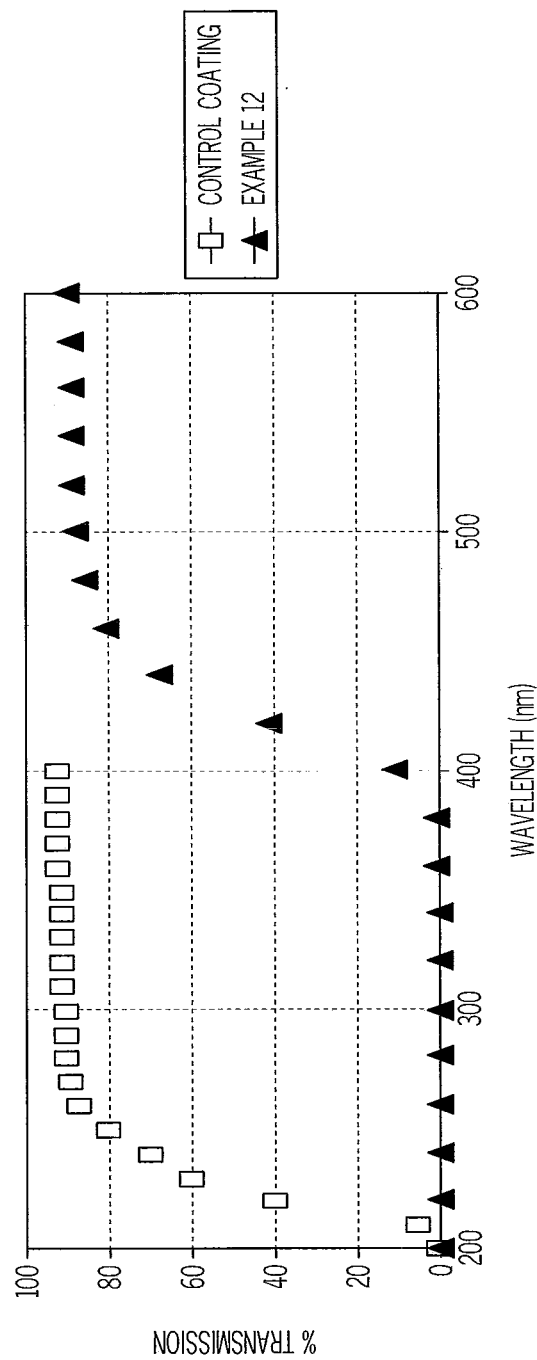
FIG. 4 is a graph illustrating ultra-violet (UV) visible spectrum vs. percent transmittance (% T) of the coatings described in Example 12. It compares the % T of the modified polyurethane coating (the present invention, which is labeled in the legend as Example 12) at various wavelengths to that of the unmodified (neat) polyurethane coating (labeled as Control in the legend) to demonstrate the UV absorptive capability of the present invention.

The result is shown in FIG. 4. FIG. 4 is a graph illustrating ultra-violet (UV) visible spectrum vs. percent transmittance (% T) of the coatings described in Example 12. It compares the % T of the modified polyurethane coating (the present invention, which is labeled in the legend as Example 12) at various wavelengths to that of the unmodified (neat) polyurethane coating (labeled as Control in the legend) to demonstrate the UV absorptive capability of the present invention.

Discussion:

Comparing FIG. 3 with FIG. 4, it is found that the modified polyurethane coating with 0.53 wt % carbazole modified silane to a 40 wt % polyurethane dispersion (Example 10A material) was able to absorb UV light to about 400 nm, while the modified polyurethane with 1.45 wt % carbazole modified silane to a 40 wt % polyurethane dispersion was only able to absorb UV light up to about 350 nm. Therefore, decreasing the loading of the carbazole modified silane in a polyurethane coating produces a more effective UV absorber that can provide protection over the wider range of wavelengths in the UV spectrum of from about 290 to about 400 nm. While not wishing to be bound by theory, it is presently believed that slight structural incompatibilities between the carbazole modified silane and the polyurethane might be the reason that a lower loading of carbazole modified silane provides for a more effective UV absorber.

Example 13

This example illustrates the use of carbazole modified silane obtained from Example 10 Step A as a UV absorbing coating for food packaging applications. In addition, this example compares the effects of adding titanium isopropoxide and zirconium oxide to carbazole modified silane on UV absorption capability for food packaging applications.

Step A: To a solution obtained from Example 10A in the amount of 499.6 mg was added 246.7 mg of Ti(i-OPr)$_4$ under stirring. The resulting solution was then spin coated on polyethylene (PE) and poly ethylene terephthalate (PET) films between 1000 and 3000 rpm for 1 minute followed by drying at room temperature.

The titanium based carbazole modified silane coated PE and PET films were then cured in the microwave oven for 30 seconds. The enhanced UV absorption of these films, relative to the films without such titanium based carbazole-silane coatings (the control) is shown in FIGS. 5 and 6.

Figure 7:
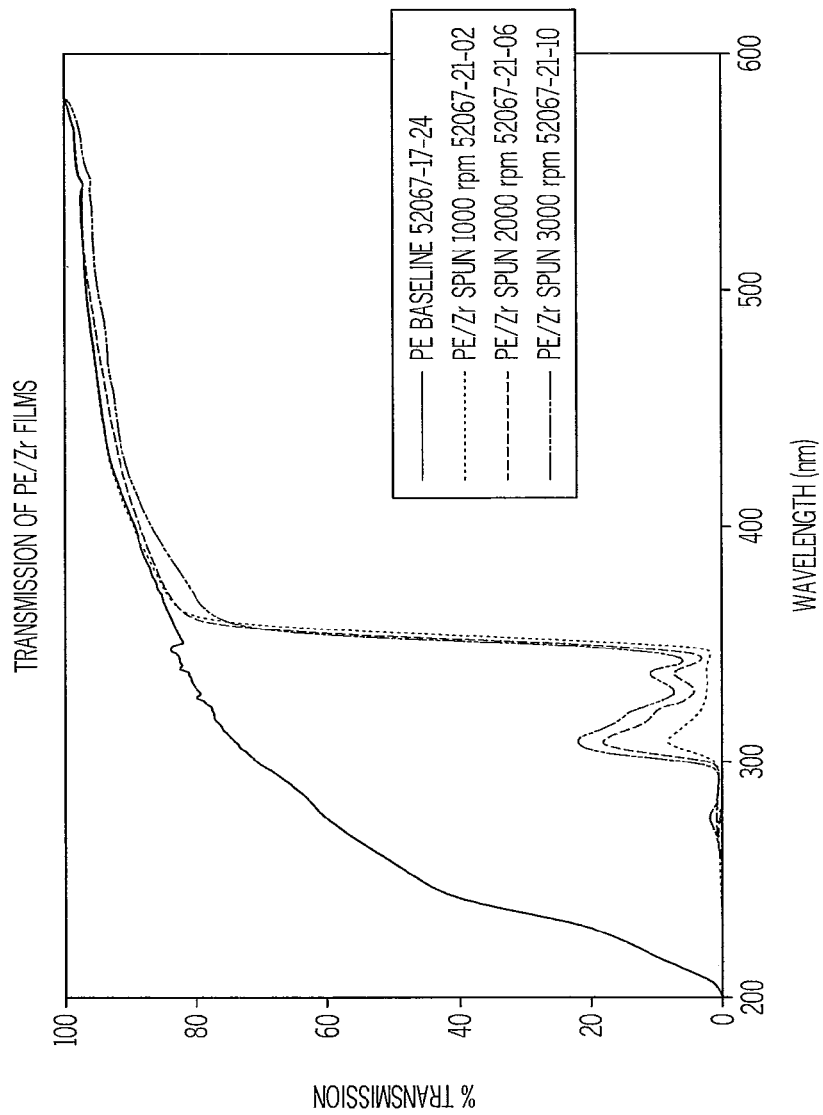
FIG. 7 is a graph illustrating ultra-violet (UV) visible spectrum vs. percent transmittance (% T) of the PE films coated with a zirconium based UV absorbing film as detailed in Example 13B. It compares the % T of the zirconium coated PE films with different spin coating speeds (the present invention, which is labeled in the legend as PE/Zr) at various wavelengths to that of the PE only film (labeled as PE Baseline in the legend) to demonstrate the UV absorptive capability of the present invention.
Figure 8:
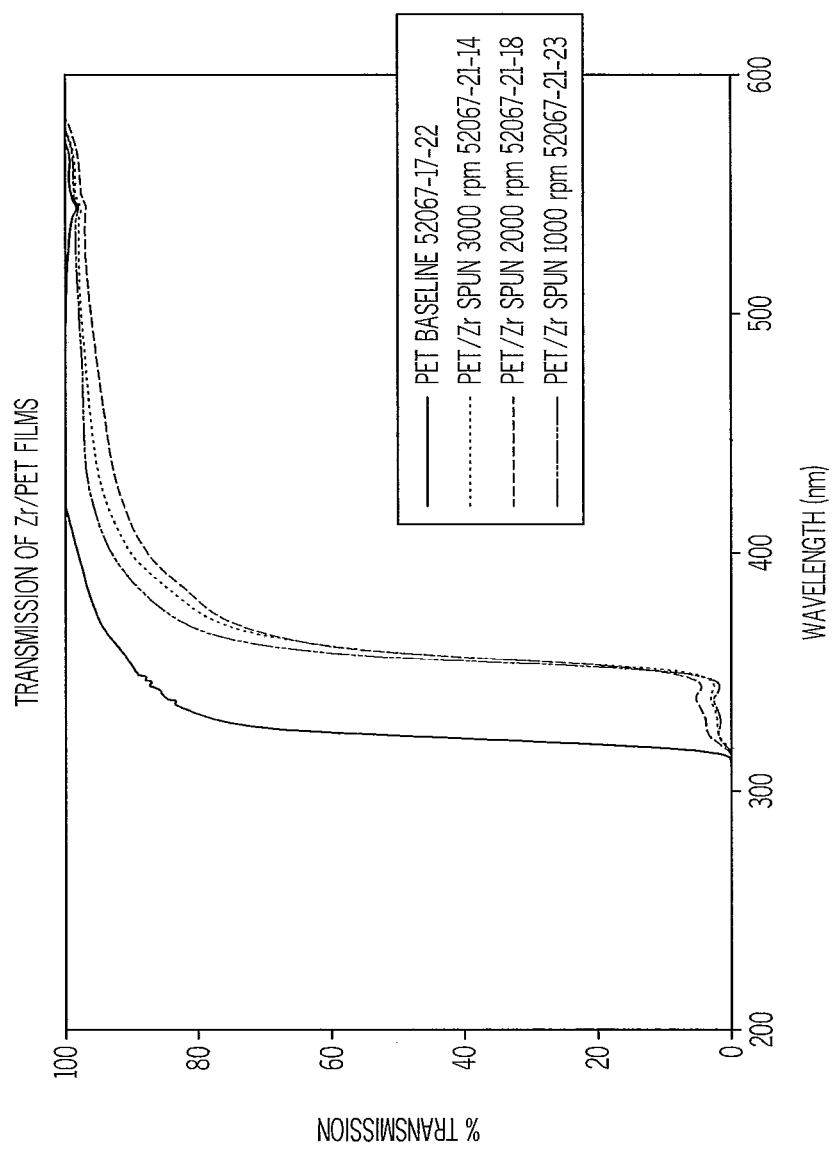
FIG. 8 is a graph illustrating ultra-violet (UV) visible spectrum vs. percent transmittance (% T) of the PET films coated with a zirconium based UV absorbing film as described in Example 13B. It compares the % T of the zirconium coated PET films with different spin coating speeds (the present invention, which is labeled in the legend as PET/Zr) at various wavelengths to that of the PE only film (labeled as PET Baseline in the legend) to demonstrate the UV absorptive capability of the present invention.

Step B: To a solution of 501.2 mg of the material obtained from Example 10A 258.3 mg Zr(nPr) was added under stirring. The resulting solution was then spin coated on PE and PET films between 1000 and 3000 rpm for 1 minute at room temperature. The carbazole modified silane/ZrO$_2$ coated PE and PET films were then cured in the microwave oven for 30 seconds. The enhanced UV absorption of these films, relative to the films without coatings (the control) is shown in FIGS. 7 and 8.

The results of this example are shown in FIGS. 5-8.

Figure 5:
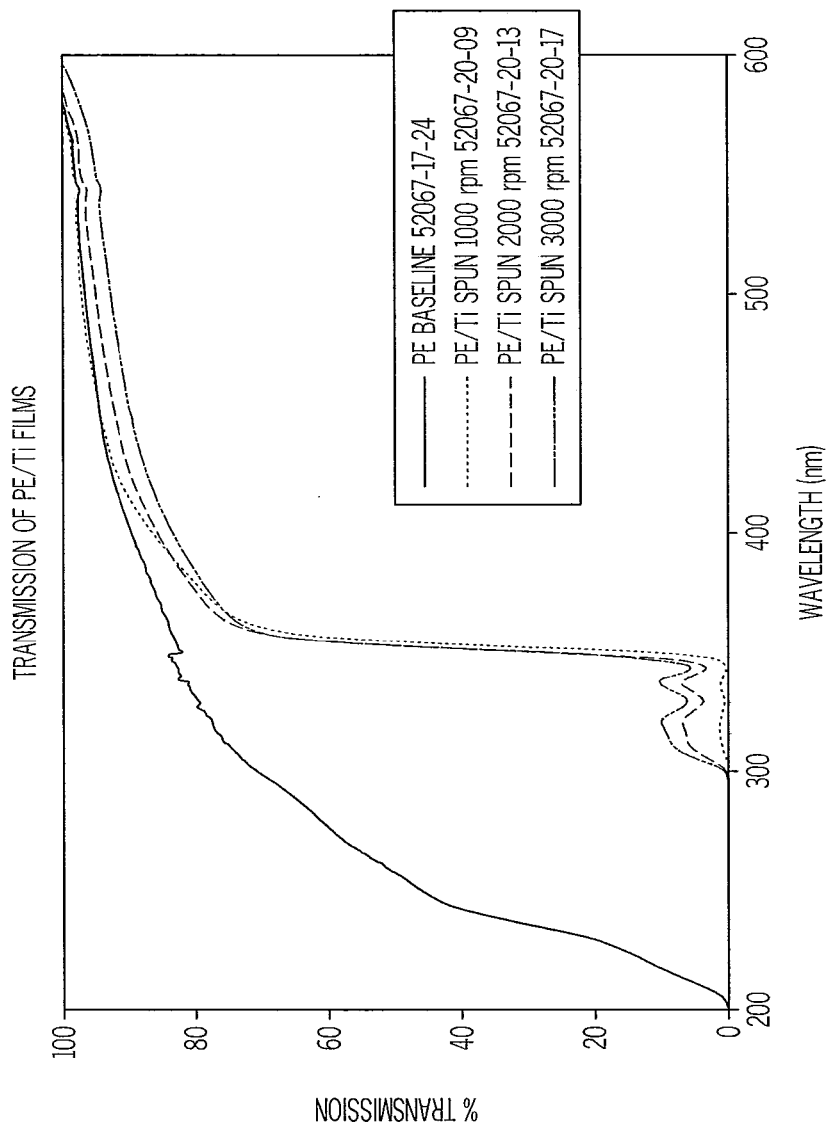
FIG. 5 is a graph illustrating ultra-violet (UV) visible spectrum vs. percent transmittance (% T) of the polyethylene films (PE films) coated with a titanium based UV absorbing film as described in Example 13A. It compares the % T of the titanium coated PE films with different spin coating speeds (the present invention, which is labeled in the legend as PE/Ti) at various wavelengths to that of the PE only film (labeled as PE Baseline in the legend) to demonstrate the UV absorptive capability of the present invention.
Figure 6:
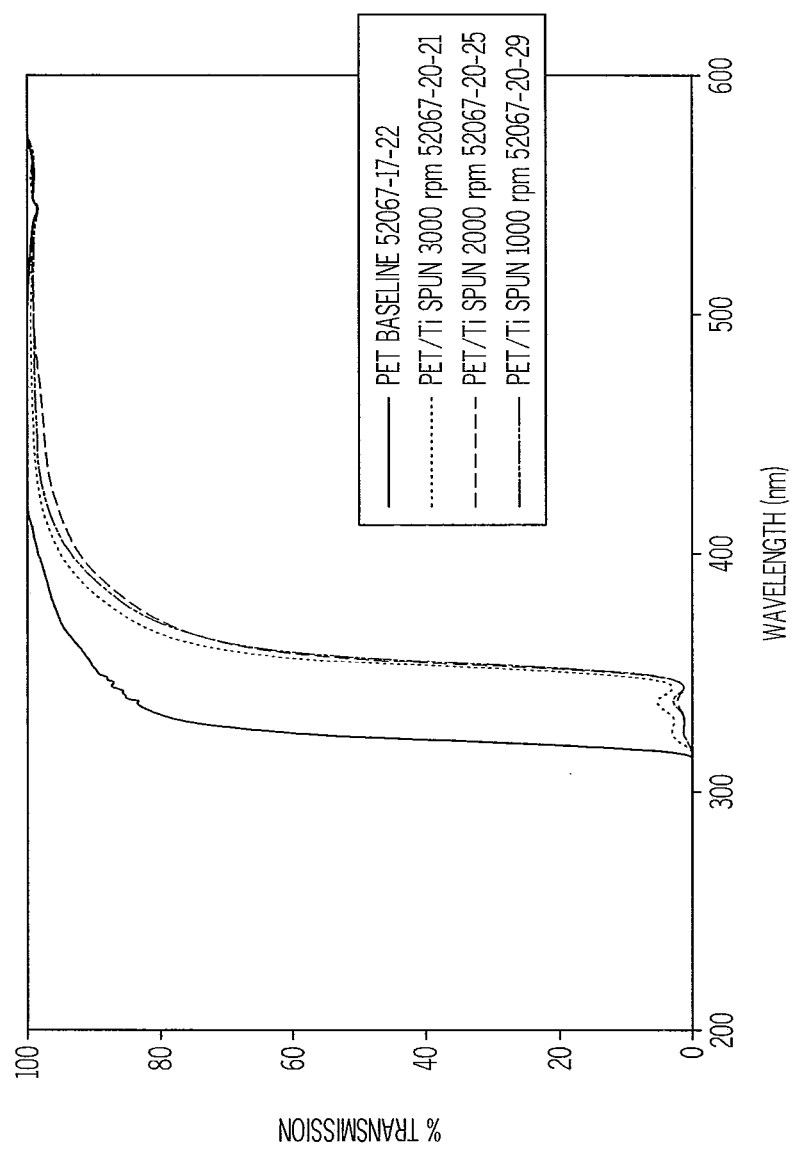
FIG. 6 is a graph illustrating ultra-violet (UV) visible spectrum vs. percent transmittance (% T) of the polyethylene terephthalate films (PET films) coated with a titanium based UV absorbing film as detailed in Example 13A. It compares the % T of the titanium coated PET films with different spin coating speeds (the present invention, which is labeled in the legend as PET/Ti) at various wavelengths to that of the PET only film (labeled as PET Baseline in the legend) to demonstrate the UV absorptive capability of the present invention.

FIG. 5 is a graph illustrating ultra-violet (UV) visible spectrum vs. percent transmittance (% T) of the polyethylene films (PE films) coated with a titanium based UV absorbing film as detailed in Example 13A. It compares the % T of the titanium coated PE films with different spin coating speeds (the present invention, which is labeled in the legend as PE/Ti) at various wavelengths to that of the PE only film (the control, labeled as PE Baseline in the legend) to demonstrate the UV absorptive capability of the present invention.

FIG. 6 is a graph illustrating ultra-violet (UV) visible spectrum vs. percent transmittance (% T) of the polyethylene terephthalate films (PET films) coated with a titanium based UV absorbing film as detailed in Example 13A. It compares the % T of the titanium coated PET films with different spin coating speeds (the present invention, which is labeled in the legend as PET/Ti) at various wavelengths to that of the PET only film (the control, labeled as PET Baseline in the legend) to demonstrate the UV absorptive capability of the present invention.

FIG. 7 is a graph illustrating ultra-violet (UV) visible spectrum vs. percent transmittance (% T) of the PE films coated with a zirconium based UV absorbing film as detailed in Example 13B. It compares the % T of the zirconium coated PE films with different spin coating speeds (the present invention, which is labeled in the legend as PE/Zr) at various wavelengths to that of the PE only film (the control, labeled as PE Baseline in the legend) to demonstrate the UV absorptive capability of the present invention.

FIG. 8 is a graph illustrating ultra-violet (UV) visible spectrum vs. percent transmittance (% T) of the PET films coated with a zirconium based UV absorbing film as detailed in Example 13B. It compares the % T of the zirconium coated PET films with different spin coating speeds (the present invention, which is labeled in the legend as PET/Zr) at various wavelengths to that of the PET only film (the control, labeled as PET Baseline in the legend) to demonstrate the UV absorptive capability of the present invention.

Discussion:

According to FIGS. 5-6, both PE and PET films, after being modified with a mixture of titanium based carbazole modified silane, were able to absorb UV light up to about 350 nm, while the films with only PE or with only PET were only able to absorb UV light up to about 200 or about 310 nm respectively. Similarly, as shown in FIGS. 7-8, the PE and PET films modified with zirconium based carbazole modified silane were able to increase the absorption of UV light to about 350 nm. No difference was observed in UV absorption capability for films made with different spin coating rates.

Moreover, while not wishing to be bound by theory, it is presently believed that by varying the ratio between the carbazole modified silane and the titanium alkoxide, a carbazole modified silane/titanium oxide composition might be produced that can absorb UV light up to about 400 nm.

In other words, metal alkoxides, such as titanium or zirconium alkoxide, were able to increase UV absorption for PE or PET films coated with the carbazole modified silane. Therefore, the metal oxide based carbazole modified silane can be useful for applications requiring enhanced UV protection, such as food packaging, in providing protection over the range of wavelengths in the UV spectrum of from about 290 to about 400 nm.

Example 14

This example illustrates the preparation of a Ti Sol/Gel in the presence of Poly (N-vinyl carbazole) (PVC) copolymer and siliconized urethane acrylate (Sartomer CN 990®) without AAEM.

Step A

In the first step poly (N-vinyl carbazole) copolymers (Table 7) were prepared by charging vinyl carbazole, Sartomer CN 990®, an initiator (AIBN) and a solvent (toluene) into a four neck 250 mL round bottom flask fitted with a mechanical stirrer, a condenser (with an inert gas outlet adapter), and a thermocouple adapter with a Teflon® coated thermocouple and an addition funnel with an inert gas inlet adaptor. The reactants were heated to 60° C. with constant stirring and under an inert gas blanket. The reaction was carried out for 12 hours.

Step B

Poly(N-vinyl carbazole) copolymer obtained from step A was weighed in a vial containing a magnetic stir bar. Then the Ti(i-OPr)$_4$ was added within two minutes and the mixture was stirred at room temperature on a stir plate for five minutes.

The resultant solution was spin coated on a quartz plate and heated at 80° C. for 30 minutes in a convection oven.

The formulation details for making a Ti sol/gel in the presence of poly (N-vinyl carbazole) copolymer and their optical properties are given in Tables 8A, while the observations regarding the composition films are listed in Table 8B.

TABLE 8A

Formulations for making poly(N-vinyl carbazole) copolymers according to step A

| | Polymerization Run (Charges in ) | |
|---|---|---|
| | 1 | 2 |
| Composition | | |
| N-vinyl Carbazole | 262.3 mg | 987.6 mg |
| Sartomer CN990 ® | 639 mg | 108.4 mg |
| AIBN | 3.5 mg | 2.3 mg |
| Toluene (mL) | 5 | 5 |
| Properties | | |
| Refractive Index | | |
| UV (% Transmissions, nm) | | |
| 350 | 52.2 | 0.3 |
| 400 | 91.7 | 4.8 |
| 450 | 92.2 | 6 |

TABLE 8B

Observations for the composition films

| Polymerization Run | Observation |
|---|---|
| 1 | Resulting composition films were too tacky and opaque to get any refractive index reading. |
| 2 | Good thick films were obtained through the cast method, but these films were too opaque to generate any refractive index, which makes it not useful for anti-reflective coating applications. |

Discussion:

According to Table 8B, the addition of siliconized urethane acrylate (Sartomer CN990®) resulted in films being too opaque to generate any refractive index values. However, a lower loading of Sartomer CN990® increased the processability of the Sartomer/PVC copolymer to provide for better thick film coatings. While not wishing to be bound by theory, it is presently believed that either a much lower loading of Sartomer or other acrylates might be able to provide more transparent films with high refractive index values.

On the other hand, Table 8B shows that the addition of Sartomer CN990® resulted in a Sartomer/PVC/TiO$_2$ composition that was capable of absorbing UV light to about 350 nm or 400 nm.

Example 15

This example illustrates the introduction of metal oxides to a high viscosity poly (aryl alkyl silicone) resin using a sol-gel approach. A high viscosity poly (aryl alkyl silicone) resin is defined as a poly(aryl alkyl silicone) resin with a viscosity equal to or above 10,000 cSt.

In this example, the high viscosity poly (aryl alkyl silicone) resin (HVSR) comprises a mixture of SCR-1011A and SCR-1011B in a ratio as specified in Table 9. SCR-1011 is supplied by Shin-Etsu under the trade name SCR-1011.

Metal alkoxides used in the sol-gel approach were titanium isopropoxide ("Ti(iPr)"), titanium ethoxide ("Ti ethoxide"), and titanium acetyl acetone ("TiAA").

Procedure (this procedure does not apply to sample 7-10-9):
(1) A specified amount of SCR 10118 was mixed with a titanium alkoxide along with one or more additives, if any, in a glass vial and stirred well for 10 minutes on a stir plate with a magnetic stirrer.
(2) Then mix SCR 1011A with step (1) mixture for 20 minutes on a stir plate with a magnetic stirrer.
(3) The mixture was spin coated on a quartz disc to form a preproduct.
(4) The preproduct was then heated or cured in the convection oven at 80° C. for 30 min.

Note: The additive can be a catalyst, a hydrolyzation agent, a solvent, or a mixture thereof.

The formulation details are given in Table 9 along with refractive index values and the UV transmittance of the product at specified wavelengths. Note: all percentages (%) listed in the table are wt % based on total sample weights.

TABLE 9

Formulation details, RI and UV transmittance of the product at specified wavelengths.

| Sample ID | SCR1011-A (mg) | SCR1011-B (mg) | Titanium Alkoxide (mg) | Additives (mg) | Refractive Index | % Transmission 350 nm | 400 nm | 450 nm |
|---|---|---|---|---|---|---|---|---|
| 7-8 | 298.9 | 287.9 | — | — | 1.542 | — | — | — |
| 7-8-23 | 518.7 | 501.4 | Ti(iPr) 48.3 | — | 1.544 | — | — | — |
| 7-9-2 | 359.2 | 417.1 | Ti(iPr) 60.8 | nitric acid: 1.62 | 1.547 | — | — | — |
| 7-10-9* | 342.4 | 345.5 | Ti(iPr) 72.2 | — | 1.549 | — | — | — |
| 7-10-17 | 443.2 | 433.4 | Ti(iPr) 87.5 | acrylic acid: 15.0 | 1.546 | — | — | — |
| 7-10-30 | 297.7 | 295.5 | Ti(iPr) 63.4 | H$_2$O: 1.73 | 1.551 | — | — | — |
| 7-11-2 | 297.7 | 295.5 | Ti(iPr) 63.4 | H$_2$O: 1.75 | 1.551 | — | — | — |
| 7-12-13 | 312.3 | 305.8 | Ti(iPr) 73.8 | nitric acid (0.36) + H$_2$O (2.58) | 1.5573 | — | — | — |
| 7-12-26 | 259.2 | 247.5 | Ti(iPr) 95.3 | nitric acid (0.18) + H$_2$O (1.29) | 1.5625 | — | — | — |
| 7-14-15 | 329.3 | 314.0 | Ti(iPr) 123.1/TiAA 13.0 | nitric acid (0.19) + H$_2$O (1.36) | 1.5676 | — | — | — |
| 7-16-2 | 211.0 | 221.7 | Ti(iPr) 90.8/TiAA 7.1 | nitric acid (0.22) + H$_2$O (1.54) | 1.5625 | — | — | — |
| 7-16-10 | 211.0 | 221.7 | Ti(iPr) 90.8/TiAA 19.8 | nitric acid (0.22) + H$_2$O (1.54) | 1.5631 | — | — | — |
| 7-16-16 | 211.0 | 221.7 | Ti(iPr) 110.0/TiAA 19.8 | 1-butanol (1.04) | 1.565 | 16.9 | 70.3 | 86.9 |
| 7-16-25 | 322.7 | 343.8 | Ti(iPr) 162.7 | H$_2$O (1.91) + nitric acid (0.39) in 1-butanol (21.9) | 1.5634 | 54.9 | 70.6 | 82.6 |
| 7-16-31 | 322.7 | 343.8 | Ti(iPr) 162.7/TiAA 71.2 | H$_2$O (1.91) + nitric acid (0.39) in 1-butanol (21.9) | 1.5671 | 1.5 | 39.5 | 77.6 |
| 7-17-5 | 215.2 | 222.0 | Ti(iPr) 76.6 | H$_2$O (3.3) + nitric acid (0.51) | 1.5547 | 40 | 59.8 | 71.4 |
| 7-17-15 | 215.2 | 222.0 | Ti(iPr) 76.6/TiAA 13.6 | H$_2$O (3.3) + nitric acid (0.51) | 1.5522 | 9.3 | 48.1 | 68.4 |

TABLE 9-continued

Formulation details, RI and UV transmittance of the product at specified wavelengths.

| Sample ID | SCR1011-A (mg) | SCR1011-B (mg) | Titanium Alkoxide (mg) | Additives (mg) | Refractive Index | % Transmission | | |
|---|---|---|---|---|---|---|---|---|
| | | | | | | 350 nm | 400 nm | 450 nm |
| 7-17-22 | 351.0 | 357.2 | Ti(iPr) 267.7 | H$_2$O (2.80) + nitric acid (0.67) in 1-butanol (32.13) | 1.576 | 17.8 | 38.5 | 53.5 |
| 7-17-29 | 351.0 | 357.2 | Ti(iPr) 267.7 | H$_2$O (4.5) + nitric acid (1.1) in 1-butanol (51.86) | 1.5756 | 23.5 | 45.1 | 59.3 |
| 7-18-2 | 363.3 | 357.0 | Ti(iPr) 155.1 | H$_2$O (0.54) + nitric acid (0.11); tetraethoxysilane (19.4) | 1.564 | 48.4 | 66.6 | 75.9 |
| 7-9-19 | 277.5 | 290.8 | Ti ethoxide 55.9 | — | 1.552 | — | — | — |
| 7-9-22 | 287.5 | 263.2 | Ti ethoxide 94.9 | — | 1.556 | — | — | — |
| 7-9-28** | 272.9 | 250.2 | Ti ethoxide 90.2 | — | 1.573 | — | — | — |
| 7-14-2 | 363.1 | 368.8 | Ti ethoxide 123.1 | nitric acid (0.26) + H$_2$O (1.82) | 1.5636 | — | — | — |
| 7-14-28 | 256.2 | 268.0 | TiAA 10.80 | H$_2$O (3.04); vinyl carbazole (13.2) | 1.5525 | — | — | — |

*For sample 7-10-9, the procedure was as follows: (1) 342.9 mg SCR 1011A was mixed with 72.2 mg titanium isopropoxide in a glass vial and stirred well for 10 minutes on a stir plate with a magnetic stirrer. (2) Then mix 345.5 mg SCR 1011B with step (1) mixture for 20 minutes on a stir plate with a magnetic stirrer. (3) The mixture was spin coated on a quartz disc to form a preproduct. (4) The preproduct was then heated or cured in the convection oven at 80° C. for 30 min.
**For sample 7-9-28, poor transmission was observed.

Discussion:

According to Table 9, titanium isopropoxide was found to provide moderate reactivity with HVSR and smaller particle sizes when compared with other titanium alkoxides, such as titanium ethoxide or TiAA.

In evaluating different catalysts, both acrylic acid and nitric acid were found to be effective. However, acrylic acid resulted in more transparent films, presumably due to smaller particle sizes of the resulting compositions.

The amount of water was found to be very critical in a sol-gel process. Crystalline titanium is presumably formed when the water content is above 0.2 wt %. In this example, a very small amount of phase separation was observed. While not wishing to bound by theory, it is presently believed the phase separation was due to a very high hydrophobicity of the silicone resin. Therefore, a low level of water, preferably about 0.05 wt %, is preferred.

In evaluating different solvents or cosolvents, it was found toluene or similar aromatic hydrocarbon is the only choice due to the limited solubility of siloxanes resins. However, a small amount of isopropyl alcohol (IPA) or acetone added as a cosolvent was proven to be useful for higher titanium oxide and water loadings.

SCR 1011-B and SCR 1011-A were added in different steps to evaluate its impact on the resulting compositions. It is found that due to its higher viscosity, SCR 1011-A needed to be added in step (2) instead of in step (1) to improve the processability and to produce better composition films.

Finally, it was observed that decreasing the loading of inorganic materials increased the film thickness but reduced the refractive index and led to poor transmittance at 400 nm. It was also observed that the particle size of the resulting titanium oxide nanocrystals significantly increased, which lead to poor light transmittance at 400 nm. While not wishing to be bound by theory, it is presently believed that increasing viscosity of the mixture lead to a poor agitation of the nanoparticles, which in turn increased the particle size of the titanium oxide nanocrystals. Low viscosity silicone resins (with viscosity below 10,000 cSt) were selected to resolve this problem.

Example 16

This example illustrates the introduction of metal oxides to a mixture of high viscosity and low viscosity poly(aryl alkyl silicone) resins using a sol-gel approach.

Poly(aryl alkyl silicone) resins (SR) with viscosity equal to or above 10,000 cSt classified as high viscosity silicone resins (HVSR) and silicone resins with viscosity below 10,000 cSt classified as low viscosity silicone resins (LVSR). Examples of LVSR include polydimethyl siloxanes (PDMS), methyl hydroxy siloxanes (MHS), phenyl methyl siloxanes (PMS), and diphenol siloxanes-co-dimethyl siloxanes (DPS-co-DMS).

Procedure:

(1) A specified amount of LVSR was mixed with a specified amount of titanium alkoxide, if any, along with one or more additives, if any, in a glass vial and stirred well for 10 minutes on a stir plate with a magnetic stirrer.

(2) Then mix SCR 1011A and SCR 10118 with step (1) mixture for 20 minutes on a stir plate with a magnetic stirrer.

(3) The mixture was spin coated on a quartz disc to form a preproduct (4) The preproduct was then heated or cured in the convection oven at 80° C. for 30 min.

NOTE: The additive can be a low viscosity silicone resin, a catalyst, a hydrolyzation agent, or a mixture thereof. The formulation details are given in Table 10 along with refractive index values and the UV transmittance of the product at specified wavelengths.

TABLE 10A

Formulation details, RI and UV transmittance of the product at specified wavelengths.

| Sample ID | SCR 1011-A (mg) | SCR 1011-B (mg) | Titanium Alkoxide (mg) | Low viscous silicone resin and other additives (mg) | Refractive Index | % Transmission 350 nm | % Transmission 400 nm | % Transmission 450 nm |
|---|---|---|---|---|---|---|---|---|
| 7-15-02* | 286.6 | 270.1 | Ti(iPr) 119.0 | PDMS (112.8), no H₂O or nitric acid | 1.5439 | — | — | — |
| 7-15-07 | 286.6 | 270.1 | Ti(iPr) 119.0 | PDMS (112.8), H₂O (1.75) + nitric acid (0.25) | 1.5358 | — | — | — |
| 7-15-10 | 256.3 | 259.5 | Ti(iPr) 114.7 | PDMS (128.3), H₂O (1.64) + nitric acid (0.23); | 1.5502 | — | — | — |
| 7-15-31 | 220.2 | 213.8 | Ti(iPr) 89.1 | PDMS (91.7), H₂O (1.68) + nitric acid (0.24) | 1.5555 | — | — | — |
| 7-19-8 | 149.3 | 169.8 | — | (45% MHS)-co-(55% PMS) (44.7) | 1.5367 | 91.3 | 91.9 | 92.4 |
| 7-19-15 | 149.3 | 169.8 | Ti(iPr) 75.7 | (45% MHS)-co-(55% PMS) (44.7) | 1.5669 | 67.8 | 78.8 | 84.9 |
| 7-19-22 | 149.3 | 169.8 | Ti(iPr) 75.7 | (45% MHS)-co-(55% PMS) (44.7); H₂O (0.40)/nitric (0.0011) | 1.5638 | 64.7 | 74.1 | 80.7 |
| 7-20-3 | 235.8 | 235.1 | — | (18% DPS)-co-(82% DMS) (34.1) | 1.5409 | 51.8 | 60.9 | 68.1 |
| 7-20-10 | 235.8 | 235.1 | Ti(iPr) 116.7 | (18% DPS)-co-(82% DMS) (34.1) | 1.555 | 43.1 | 57.9 | 66.7 |

TABLE 10B

Film Quality of Formulations in Table 10A

| Sample ID | Film Quality |
|---|---|
| 7-15-02 | opaque film |
| 7-15-07 | good clear colorless film |
| 7-15-10 | opaque film |
| 7-15-31 | opaque film |
| 7-19-8 | Good clear film |
| 7-19-15 | Film was very clear, but very bumpy |
| 7-19-22 | Slight opaque film |
| 7-20-3 | Slight opaque film |
| 7-20-10 | Mostly clear film |

Discussion:

In this example, it was found that percent transmission was significantly improved when a 20 wt % of the SCR 1011 (a high viscosity silicone resin) was replaced by a (18% DPS)-co-(82% DMS) resin (a low viscosity silicone resin). However, the addition of LVSRs reduced refractive index values significantly.

Tables 10A and 10B also show that increasing metal alkoxide concentration increased the refractive index but significantly decreased light transmission at 350 nm, which resulted in opaque films. Presumably, the incorporation of a high refractive functional group might be able to increase the refractive index further while still increasing percent transmission at specified wavelengths.

Example 17

This example illustrates the effect of adding vinyl carbazole (VC) to a metal alkoxide and a poly(aryl alkyl silicone) resin with viscosity above 10,000 cSt (High Viscosity Silicone Resin—HVSR) using a sol-gel approach.

Procedure:

(1) Dissolve a specified amount of VC in a specified amount of toluene by adding VC to toluene and stirring well on a stir plate with a magnetic stirrer for 20 minutes.
(2) Add SCR 1011-B and titanium alkoxide, if any, to the VC solution (step 1 mixture) and stir for 5 minutes.
(3) Add SCR 1011-A to step 2 mixture and stir for another 5 minutes.
(4) The mixture was spin coated on a quartz disc to form a preproduct.
(5) The preproduct was then heated or cured in the convection oven at 80° C. for 30 min.

The formulation details are given in Table 11 along with refractive index values and the UV transmittance of the product at specified wavelengths.

TABLE 11

Formulation details, RI and UV transmittance of the product at specified wavelengths.

| Sample ID | SCR 1011-A (mg) | SCR 1011-B (mg) | Titanium Alkoxide (mg) | Additives (mg) | Refractive Index | % Transmission 350 nm | % Transmission 400 nm | % Transmission 450 nm |
|---|---|---|---|---|---|---|---|---|
| 7-26-2 | 175.3 | 178.1 | — | VC (38.6); toluene (224.1) | 1.5554 | 1.9 | 91.4 | 91.8 |
| 7-26-20 | 175.3 | 178.1 | — | VC (84.2); toluene (224.1) | 1.5672 | 0.3 | 90.8 | 91.4 |
| 7-27-2 | 175.3 | 178.1 | Ti(iPr) 47.9 | VC (84.2); toluene (224.1) | 1.61 | 0.3 | 2.2 | 8.4 |
| 7-28-27 | 40.5 | 44.5 | — | VC (47.4); toluene (78.8) | 1.549 | 2.5 | 88.9 | 90.5 |

Discussion:

Table 11 shows that the addition of a vinyl carbazole (VC) functional group increased the refractive index of the silicone group only slightly. However, the light transmission above 350 nm was adversely affected when VC, high viscosity silicone resins (SCR 1011-A and SCR 1011-B) and titanium alkoxide were mixed together. Presumably, the incorporation of low viscosity silicone into the VC/HVSR/titanium oxide mixture can resolve this problem.

Example 18

This example illustrates the introduction of metal oxides to poly(aryl alkyl silicone) resin and carbazole derivatives using a sol-gel approach.

(3) Add a specified amount of SCR 1011-A, if any, to the LVSR/Ti mixture; then immediately add a specified amount of SCR 1011-B, if any, and mix for 20 minutes on a stir plate with a magnetic stirrer.

(4) The resulting mixture was spin coated on a quartz disc to form a preproduct.

(5) The preproduct was heated or cured in the convection oven at 80° C. (or a specified temperature) for 30 min (or a specified time).

The formulation details are given in Table 12 along with refractive index values and the UV transmittance of the product at specified wavelengths. Please note: the percentages are all percentages by weight (wt %).

TABLE 12

Formulation details, RI and UV transmittance of the product at specified wavelengths.

| Sample ID | Low Viscosity Silicone Resins (LVSR) (mg) | Titanium precursor | Refractive Index | Additives/Comments | % Transmission | | |
|---|---|---|---|---|---|---|---|
| | | | | | 350 nm | 400 nm | 450 nm |
| 7-29-17 | Gelest hydride (103.4) | — | 1.493 | 9H-carbazole-9-ethanol (26.1 mg) | 14 | 75.9 | 82.5 |
| 7-29-24* | Gelest hydride/Gelest silanol mixture (103.4 hydride, 54.1 silanol) | — | — | 9H-carbazole-9-ethanol (26.1) | — | — | — |
| 7-29-30 | Gelest hydride/Gelest silanol mixture (103.4 hydride, 54.1 silanol) | Ti($i$Pr): 36.8 | 1.5655 | 9H-carbazole-9-ethanol (26.1) | 0.3 | 15 | 47 |
| 7-30-11 | Gelest hydride (68.7) | Ti($i$Pr): 50.8 | 1.4973 | 9H-carbazole-9-ethanol (10.8) | 4.9 | 42.6 | 51.8 |
| 7-30-20 | Gelest hydride (132.0) | Ti($i$Pr): 101.7 | 1.5354 | 9H-carbazole-9-ethanol (114) | 2.9 | 25.8 | 37.6 |
| 7-31-8* | Gelest hydride (69.8) | Ti($i$Pr): 35.3 | — | 9H-carbazole-9-ethanol (73.1) | — | — | — |
| 7-31-15** | Gelest hydride (69.8) | Ti($i$Pr): 58.5 | — | 9H-carbazole-9-ethanol (73.1) | 29.7 | 31.6 | 32.2 |
| 7-32-2 | Gelest hydride/Gelest silanol mixture (68.0 silanol, 10.3 hydride) | Ti($i$Pr): 35.6 | 1.5689 | 9H-carbazole-9-ethanol (22.6 mg) | 0.6 | 42.7 | 70 |
| 7-32-11 | Gelest hydride/Gelest silanol mixture (68.0 silanol, 10.3 hydride) | Ti($i$Pr): 60.8 | 1.6008 | 9H-carbazole-9-ethanol (22.6 mg) | 0.3 | 3.6 | 38.3 |
| 7-34-2 | SCR-1011 (A: 73.7, B: 82.8) | — | 1.551 | 9H-carbazole-9-ethanol (20.4 mg) | 0.3 | 18.8 | 29.7 |
| 7-34-10 | SCR-1011 (A: 73.7, B: 82.8) | Ti($i$PR): 35.7 | 1.5479 | 9H-carbazole-9-ethanol (20.4 mg) | 0.3 | — | — |
| 7-46-16*** | Gelest hydride (43.2) | Ti($i$Pr): 42.9 | opaque | 9H-carbazole-9-ethanol (35.1 mg) | — | 16.4 | 27 |
| 7-52-17 | Gelest silanol (73.6)/hydride (14.2) | Ti($i$Pr): 38.6 | 1.5607 | 9H-carbazole-9-ethanol (22.7 mg) | 0.3 | 7 | 35.9 |
| 7-52-25 | Gelest silanol (73.6)/hydride (14.2) | Ti($i$Pr): 38.6 | 1.5673 | 9H-carbazole-9-ethanol (22.7 mg) + tetravinyldimethoxsilane (3.4 mg) | 0.3 | 0.3 | 7.3 |

*In these samples, the resulting composition films did not cure.
**In sample 7-31-8, the resulting composition film was tacky red/brown.
***In this sample, the resulting composition film was cured but was opaque yellow.

Procedure:

(1) A specified amount of a low viscosity silicone resin (or a mixture of low viscosity resins), if any, was mixed with a carbazole derivative (2-(9H-carbazol-9-yl)ethanol, also called 9H-carbazole-9-ethanol), and one or more additives, if any, for 20 minutes on a stir plate with a magnetic stirrer.

(2) Then, a specified amount of titanium alkoxide, if any, was added to the LVSR mixture in a glass vial and stirred well for 10 minutes on a stir plate with a magnetic stirrer.

Discussion:

Table 12 shows that the addition of a carbazole derivative/precursor (9H-carbazole-9-ethanol) increased the refractive index of the silicone group slightly. However, the light transmission above 350 nm was adversely affected. It was found that these compositions were composed of amorphous titanium dioxide instead of the preferred crystalline titanium dioxide. Presumably, a carboxy-terminated silicone resin can incorporate the carbazole derivative (9H-carbazole-9-ethanol) onto its siloxane backbone via a hydrosilylation reaction more effectively. Similarly, a vinyl terminated low viscosity silicone resin might incorporate 9H-carbazole more effec tively onto its siloxane backbone. Please see FIG. 9 for an example of a hydrosilylation reaction, in which a carbazole function group was introduced onto a siloxane backbone via a hydrosilylation reaction between a siloxane resin and a carbazole derivative.

A more effective interface between the three components, namely silicone resin, carbazole and titanium alkoxide, is expected to increase the refractive index while also increasing light transmittance, such as linking carbazole to a silane via a one step addition followed by a sol-gel reaction as described in Example 10A (carbazole modified silane).

Example 19

This example illustrates the introduction of metal oxides to poly(aryl alkyl silicone) resin and carbazole modified silane using a sol-gel approach.
Procedure:
(1) A specified amount of titanium alkoxide (Ti) was mixed with a specified amount of the carbazole modified silane (VC—Si) for 10 minutes on a stir plate with a magnetic stirrer. Note: in some samples, carbazole modified silanes were diluted with DMAC to achieve specified solid wt %. For example, in sample 7-86-10, the VC—Si was diluted with DMAC to achieve 35 wt % solid.
(2) Then, specified amounts of SCR 1011-A and SCR 1011-B, if any, were added to the Ti/VC—Si mixture in a glass vial and stirred well for 20 minutes on a stir plate with a magnetic stirrer.
(3) The resulting mixture was spin coated on a quartz disc to form a preproduct.
(4) The preproduct was heated or cured in the convection oven at 80° C. (or a specified temperature) for 30 min (or a specified time).

The formulation details are given in Table 13 along with refractive index values and the UV transmittance of the product at specified wavelengths. Please note: the percentages are all percentages by weight (wt %).

TABLE 13

Formulation details, RI and UV transmittance of the product at specified wavelengths.

| Sample # | Siloxane type | Titanium precursor | Refractive Index | Additives (mg) | % Transmission 350 nm | 400 nm | 450 nm |
|---|---|---|---|---|---|---|---|
| 7-35-02 | SCR-1011 | — | 1.5429 | VC-Si (sample 6-92-34, 43.1) | 10.7 | 90.8 | 91.3 |
| 7-35-10 | SCR-1011 (A: 132; B: 115.2) | — | 1.5418 | VC-Si (sample 6-92-34, 50.9) | 5.7 | 90.5 | 91.3 |
| 7-35-16 | SCR 1011 (A: 132; B: 115.2) | Ti(iPr): 30.0 | 1.5782 | VC-Si (sample 6-92-34, 50.9) | 1.9 | 21.2 | 28.1 |
| 7-38-02 | — | Ti(iPr): 34.8 | 1.6885 | VC-Si (sample 6-92-34, 144.7); | 0.3 | 65.2 | 80.9 |
| 7-48-02 | — | Ti(iPr): 194.1 | 1.6502 | VC-Si (sample 6-92-34, 312.2) @ ~50 wt % solids in DMAC (prepared according to example 10A, no dilution needed) | 0.3 | 30.8 | 74.7 |
| 7-48-10 | — | Ti(iPr): 25.5 | 1.6451 | VC-Si (sample 6-92-34, 100.1) @ ~50 wt % solids in DMAC (procedure according to example 10A, no dilution needed) | 0.3 | 62.2 | 78.4 |
| 7-86-10 | — | Ti(iPr): 53.1 | 1.6556 | VC-Si (sample batch# 6-94-21, 211.6) @ 35 wt % solids in DMAC (dilute example 10A sample with DMAC to achieve 35 wt % solid) | 0.3 | 37.5 | 72.9 |
| 7-86-20 | — | Ti(iPr): 53.1 | 1.6585 | VC-Si (sample 6-94-21, 211.6) + $H_2O$ (0.53) | 0.3 | 34.3 | 68.5 |

Discussion:

Table 13 shows that the addition of carbazole modified silane directly to a high viscosity silicone resin (SCR 1011) resulted in increased refractive index values along with more acceptable light transmissions. The addition of titanium alkoxide to the VC—Si/SCR 1011 mixture increased refractive index values slightly. Presumably, the addition of VC, low viscosity silicone resin, or both to this Ti/VC—Si/SCR 1011 mixture might increase refractive index values further along with better light transmissions.

Example 20

This example illustrates the effect of low viscosity silicone resins (LVSR—poly(aryl alkyl silicone) resin with viscosity below 10,000 cSt) and additives such as AAEM, vinyl carbazole (VC), high viscosity silicone resin (SCR-1011), catalyst, titanium alkoxide, and carbazole modified silane (VC—Si, made according to example 10A) in using a sol-gel approach.

Low viscosity silicone resins include poly (dimethyl siloxanes) (PDMS, or Gelest—a trademark name), methyl hydroxy siloxanes-co-phenyl methyl siloxanes (MHS-co-PMS), diphenol siloxanes-co-dimethyl siloxanes (DPS-co-DMS). These LVSRs can be either silanol terminated poly (aryl alkyl silicone) resins (silanol or silanol terminated) or hydride terminated poly(aryl alkyl silicone) resins (hydride or hydride terminated).

Procedure:

(1) A specified amount of a low viscosity silicone resin was mixed with one or more additives for 20 minutes on a stir plate with a magnetic stirrer (samples 7-47-2, 7-37-20, and 7-37-28 had a slightly different process for step (1) according to Table 12).
(2) Then, a specified amount of titanium alkoxide, if any, was added to the LVSR mixture in a glass vial and stirred well for 10 minutes on a stir plate with a magnetic stirrer.
(3) The resulting mixture was spin coated on a quartz disc to form a preproduct.
(4) The preproduct was heated or cured in the convection oven at 80° C. (or a specified temperature) for 30 min (or a specified time).

The additives were AAEM, VC, HVSR(SCR-1011), catalyst, titanium alkoxide, carbazole modified silane (VC—Si) as prepared according to Example 10A.

The formulation details are given in Table 14 along with refractive index values and the UV transmittance of the product at specified wavelengths. Note: all percentages in Table 14 are percentages based on weight (wt %).

TABLE 14

Formulation details, RI and UV transmittance of the product at specified wavelengths.

| Sample ID | Low viscous silicone resin (LVSR) (mg) | Titanium alkoxide (mg) | Refractive Index | Additives (mg)/ procedure | % Transmission | | |
|---|---|---|---|---|---|---|---|
| | | | | | 350 nm | 400 nm | 450 nm |
| 7-23-2 | P(DMS) | Ti(iPr): 748.8 | 1.5868 | AAEM (341.2)/ P(DMS) (301.0 mg) | 3.4 | 14.6 | 73.1 |
| 7-23-10 | 45% MHS-co-55% PMS | Ti(iPr): 359.1 | 1.6024 | AAEM (178.0)/ MHS-co-PMS (196.7) | 0.3 | 26.4 | 79.4 |
| 7-23-20 | 18% DPS-co-82% DMS | Ti(iPr): 323.8 | 1.6328 | AAEM (145.3)/ DPS-co-DMS (135.4) | 0.3 | 12.9 | 75.1 |
| 7-25-2 | 45% MHS-co-55% PMS | Ti(iPr): 103.2 | 1.5932 | VC-Si (95.1)/VC (45.5) in texanol/MHS-co-PMS (95.1), no $H_2O$/ nitric acid | 1.9 | 38.3 | 50.5 |
| 7-25-20 | 45% MHS-co-55% PMS | Ti(iPr): 143.2 | 1.6392 | VC-Si (100.8)/VC (67.9) in toluene/MHS-co-PMS (100.8), no $H_2O$/nitric acid | 1.6 | 60.9 | 67.8 |
| 7-27-8 | Gelest silanol terminated (69.6) + Gelest hydride terminated (65.8) | Ti(iPr): 19.4 | 1.5301*** | VC (28.3) | 2.1 | 68.2 | 71.2 |
| 7-27-14 | Gelest silanol (69.6) + Gelest hydride terminated (65.8) | Ti(iPr): 43.8 | 1.5301*** | VC (28.3) | 18.5 | 41.6 | 43 |
| 7-28-11 | Gelest silanol at 33.2% (109.8) | Ti(iPr): 150.3 | 1.6781 | VC (70.4) | 0.3 | 13.5 | 16.2 |
| 7-28-18 | Gelest silanol terminated (35.4) + Gelest hydride terminated (40.6) | Ti(iPr): 94.3 | 1.6781 | VC (43.7) | 0.3 | 18.3 | 20.2 |
| 7-29-2 | Gelest hydride (54.1) | Ti(iPr): 59.8 | 1.6405 | VC (51.0) | 0.3 | 38.1 | 45 |
| 7-29-10 | Gelest hydride (54.1) | Ti(iPr): 59.8 | 1.6736 | VC (67.4) | 0.3 | 70.5 | 76.4 |
| 7-30-2 | Gelest hydride (38.5) | Ti(iPr): 24.4 | 1.6347 | VC (47.8) | 0.3 | 35.1 | 45.5 |
| 7-31-20* | Gelest hydride (69.8)/P(DMS) hydride (35.3) | Ti(iPr): 50.6 | 1.6892 | VC (58.5) | — | — | — |
| 7-33-2 | Gelest hydride (41.2) | Ti(iPr): 49.3 | 1.6955 | VC (53.4) | 0.3 | 45.6 | 56.1 |
| 7-33-10 | Gelest hydride (54.6) | Ti(iPr): 60.9 | 1.6362 | VC (67.3) | 0.3 | 29.1 | 37.7 |
| 7-47-2 | Gelest hydride (64.5) | Ti(iPr): 72.1 | 1.6612 | VC (82.7), sonicate Gelest LVSR with VC for 15 minutes in step (1) | 0.3 | 50.1 | 59.9 |
| 7-33-18 | Gelest hydride (54.6) + Gelest silanol (7.7) | Ti(iPr): 60.9 | 1.5687 | VC (67.3) | 0.3 | 43.9 | 50.3 |
| 7-36-02 | Gelest hydride (140.2) | Ti(iPr): 52.4 | 1.5305 | — | 85.2 | 88.5 | 89.3 |
| 7-36-07* | Gelest hydride (141.5) | — | — | VC (61.9) | — | — | — |
| 7-37-02 #1 | Gelest hydride (195.2) | Ti(iPr): 216.3 | 1.5405 | VC (244.7) | 0.3 | 56.7 | 61.3 |

TABLE 14-continued

Formulation details, RI and UV transmittance of the product at specified wavelengths.

| Sample ID | Low viscous silicone resin (LVSR) (mg) | Titanium alkoxide (mg) | Refractive Index | Additives (mg)/ procedure | % Transmission 350 nm | 400 nm | 450 nm |
|---|---|---|---|---|---|---|---|
| 7-37-02 #2 | Gelest hydride (195.2) | Ti(iPr): 216.3 | 1.6288 | VC (244.7) | 0.3 | 28.4 | 31.1 |
| 7-37-02 #3 | Gelest hydride at (195.2) | Ti(iPr): 216.3 | 1.6092 | VC (244.7) | 0.3 | 29.1 | 33.9 |
| 7-37-20 | Gelest hydride (47.8) | Ti(iPr): 54.0 | 1.7102 | VC (59.2), in step (1), after mixing VC/Gelest LVSR for 20 min, let VC/Gelest sit for another 6 hours | 0.3 | 23.6 | 31.1 |
| 7-37-28 | Gelest hydride (50.4) | Ti(iPr): 47.0 | 1.7236 | VC (60.8); in step (1), after mixing VC/Gelest LVSR for 20 minutes, let VC/Gelest sit for another 24 hours | 0.3 | 20.4 | 29.3 |
| 7-37-33 | Gelest hydride (50.4) | Ti(iPr): 59.5 | 1.6628 | VC (60.8) | 0.3 | 54.1 | 57.6 |
| 7-39-02 | Gelest hydride (65.1) | Ti(iPr): 60.3 | 1.6797 | VC (59.1) | 0.3 | 45.1 | 51.8 |
| 7-39-10 | Gelest hydride (72.6) | Ti(iPr): 60.3 | 1.6216 | VC (59.1) | 0.3 | 53 | 62.5 |
| 7-39-16 #1 | Gelest hydride (152.8) | Ti(iPr): 124.9 | 1.6763 | VC (125.2) | 0.3 | 19.5 | 24.8 |
| 7-39-16 #2 | Gelest hydride (152.8) | Ti(iPr): 124.9 | 1.6638 | VC (125.2) | 0.3 | 19.8 | 26.3 |
| 7-39-16 #3 | Gelest hydride (152.8) | Ti(iPr): 124.9 | 1.6616 | VC (125.2) | 0.3 | 14.9 | 20.8 |
| 7-39-30 #1 | Gelest hydride (27.2) | Ti(iPr): 30.0 | 1.6679 | VC: (34.9) | 0.8 | 64.1 | 68 |
| 7-39-30 #2 | Gelest hydride (27.2) | Ti(iPr): 30.0 | 1.6675 | VC: (34.9) | 1 | 64.1 | 67 |
| 7-39-30 #3 | Gelest hydride (27.2) | Ti(iPr): 30.0 | 1.6714 | VC: (34.9) | 1.6 | 69 | 72.2 |
| 7-40-17 | Gelest hydride (78.9) | Ti(iPr): 49.5 | 1.6309 | VC (72.4) and titanium acetyl acetone (TiAA) (14.7) | 0.3 | 8.1 | 39.3 |
| 7-41-08 | Gelest hydride (13.3) | Ti(iPr): 38.3 | 1.6723 | VC (84.1) and SCR-1011 (A: 60.8/ B: 45.3) | 0.3 | 3.5 | 13.6 |
| 7-41-17 | Gelest hydride (45.3) | Ti(iPr): 38.3 | 1.6351 | VC (84.1) and SCR-1011 (A: 60.8/ B: 45.3) | 0.3 | 5.6 | 19.8 |
| 7-41-23 | Gelest hydride (67.5) | Ti(iPr): 58.2 | 1.6787 | VC (169.6)and SCR-1011 (A: 44.3/ B: 43.2) | 0.3 | 11 | 25 |
| 7-41-30 | Gelest hydride (174.9) | Ti(iPr): 58.2 | 1.6687 | VC (169.6) and SCR-1011 (A: 44.3/ B: 43.2) | 0.3 | 8.3 | 13 |
| 7-42-02 | Gelest hydride (37.1) | Ti(iPr): 35.3 | 1.6647 | VC (52.4) and SCR-1011 (A: 44.5/ B: 44.5) | 0.3 | 25.9 | 34.4 |
| 7-42-02 #2 | Gelest hydride (37.1) | Ti(iPr): 35.3 | 1.6007 | VC (52.4) and SCR-1011 (A: 44.5/ B: 44.5) | 0.3 | 0.7 | 2.8 |
| 7-42-12 #1 | Gelest hydride (37.1) | Ti(iPr): 44.8 | 1.6208 | VC (52.4) and SCR-1011 (A: 44.5/B: 44.5) | 0.3 | 5.6 | 16.1 |
| 7-42-12 #2 | Gelest hydride (37.1) | Ti(iPr): 44.8 | 1.626 | VC (52.4) and SCR-1011 (A: 44.5/ B: 44.5); in step (4), the preproduct was cured at 60° C. for 30 min. | 0.3 | 0.9 | 3.8 |
| 7-42-12 #3 | Gelest hydride (37.1) | Ti(iPr): 44.8 | 1.605 | VC (52.4) and SCR-1011 (A: 44.5/ B: 44.5); in step (4), the preproduct was cured at 130° C. for 10 min. | 0.3 | 1.2 | 3.1 |
| 7-42-32 | Gelest hydride (11.0) | — | 1.6793 | VC (55.4) and SCR-1011 (A: 32.2/ B: 33.2) + dibutyltin dilaurate (2.0) | 65.4 | 84 | 87.1 |

TABLE 14-continued

Formulation details, RI and UV transmittance of the product at specified wavelengths.

| Sample ID | Low viscous silicone resin (LVSR) (mg) | Titanium alkoxide (mg) | Refractive Index | Additives (mg)/ procedure | % Transmission | | |
|---|---|---|---|---|---|---|---|
| | | | | | 350 nm | 400 nm | 450 nm |
| 7-45-15 | Gelest hydride (8.5) | Ti(iPr): 5.1 | — | VC (58.7) and SCR-1011 (A: 40.3/B: 49.4) | 0.3 | 0.7 | 0.9 |
| 7-45-21* | Gelest hydride (24.5) | Ti(iPr): 111.6 | — | SCR-1011 (A: 86.9/B: 82.9) | — | — | — |
| 7-50-3 | Gelest hydride (50.0) | Ti(iPr): 57.3 | 1.6644 | VC (69.1) and SCR-1011 (A: 5.4/B: 4.7) | 0.3 | 39.5 | 57.7 |
| 7-50-12 | Gelest hydride (57.4) | Ti(iPr): 61.6 | — | VC (68.3) and Gelest silanol (5.1) | 0.3 | 29.8 | 34.3 |
| 7-50-21 | Gelest hydride (41.5) | Ti(iPr): 33.6 | 1.6566 | VC (47.1) + trace $H_2O$ (0.36) | 0.3 | 45.2 | 54.8 |
| 7-51-02 | Gelest hydride (60.0) | Ti(iPr): 61.1 | — | VC (28.3) + trace $H_2O$ (0.28) | 0.3 | 51.3 | 57.5 |
| 7-51-10 | Gelest hydride (97.1) | Ti(iPr): 73.0 | 1.5578 | tetravinyldimethylsiloxane (15.5) | 59 | 64.9 | 67 |
| 7-51-18* | Gelest hydride (97.1) | Ti(iPr): 73.0 | 1.6155 | tetravinyldimethylsiloxane (15.5) + VC (16.4)/trace $H_2O$ (0.28) | — | — | — |
| 7-51-24 | Gelest hydride (300.5) | Ti(iPr): 44.6 | 1.5093 | tetravinyldimethylsiloxane (50.6) + trace $H_2O$ (0.28) | 87.6 | 91 | 92.2 |
| 7-52-10 | Gelest hydride (300.5) | Ti(iPr): 130.8 | 1.5416 | tetravinyldimethylsiloxane (50.6) + trace $H_2O$ (0.28) | 35.2 | 35.8 | 35.4 |
| 7-52-02 | Gelest hydride (206.4 mg) | Ti(iPr): 64.5 | 1.5148 | tetravinyldimethylsiloxane (8.8) + tetraethylorthosilicate (10.4) | 79.1 | 87.4 | 89.3 |
| 7-54-02 | Gelest hydride (105.8) | Ti(iPr): 50.1 | 1.6428 | tetravinyldimethylsiloxane (9.6) + VC (44.1) | 0.3 | 28.7 | 31.5 |
| 7-87-07 | tetravinyldimethylsiloxane (11.1) | Ti(iPr): 24.6 | 1.7142 | VC (110.5), | 0.3 | 69.3 | 79.4 |
| 7-87-28 | tetravinyldimethylsiloxane (11.1) | Ti(iPr): 24.6 | 1.7181 | VC (110.5). In step (4), cured the preproduct on a hot plate at 50° C. for 30 min. | 0.3 | 60.9 | 69.3 |
| 7-88-02 | tetravinyldimethylsiloxane (10.1) | Ti(iPr): 12.0 | 1.7137 | VC (126.3) | 0.3 | 50.4 | 59.2 |
| 7-96-03* | tetravinyldimethylsiloxane (6.0) | TiAA: 30.7 | 1.7217 | VC (122.3) | — | — | — |
| 7-88-10 | tetravinyldimethylsiloxane (7.5) | Ti(iPr): 31.5 | 1.7054 | VC (65.5) + VC-Si (sample 6-94-21, 32.9); 2.5 um thick film | 0.3 | 62.5 | 79.4 |
| 7-88-20 | tetravinyldimethylsiloxane (7.5) | Ti(iPr): 31.5 | 1.7054 | VC (65.5) + VC-Si (sample 6-94-21, 32.9); 2.5 um thick film | 0.3 | 32.7 | 60.9 |
| 7-88-26 | tetravinyldimethylsiloxane (7.5) | Ti(iPr): 39.6 | 1.7058 | VC (91.8) + VC-Si (sample 6-94-21, 29.5); 6.9 um thick film | 0.3 | 23.7 | 51.4 |
| 7-96-11 | tetravinyldimethylsiloxane (12.9) | Ti(iPr): 50.8 | 1.7173 | VC (79.7) + VC-Si (sample 6-94-21, 51.1) | 0.3 | 44.1 | 63.9 |
| 7-96-19 | tetravinyldimethylsiloxane (5.8) | Ti(iPr): 50.1 | 1.699 | VC (100.3) + VC-Si (sample 6-94-21, 69.6); 5 um thick film | 0.3 | 78.5 | 86.4 |
| 7-96-27 | tetravinyldimethylsiloxane (8.0) | Ti(iPr): 50.6 | 1.6972 | VC (105.2) + VC-Si (sample 6-94-21, 69.2) | 0.3 | 78.5 | 86.7 |
| 7-101-20* | tetravinyldimethylsiloxane (3.4) | Ti(iPr): 21.4 | 1.7142 | VC (93.7) | — | — | — |
| 7-101-30 | tetravinyldimethylsiloxane (5.8) | Ti(iPr): 72.6 | 1.7145 | VC (132.7) + VC-Si (sample 6-94-21, 32.4) | 0.3 | 76.3 | 84.8 |
| 7-91-02 | tetravinyl methylcyclo-tetrasiloxane (9.4) | Ti(iPr): 31.4 | 1.6774 | VC (80.7) | 0.9 | 2.6 | 5.8 |
| 7-91-14** | tetravinyl methylcyclo- | Ti(iPr): 110.7 | — | VC (117.7) | — | — | — |

TABLE 14-continued

Formulation details, RI and UV transmittance of the product at specified wavelengths.

| Sample ID | Low viscous silicone resin (LVSR) (mg) | Titanium alkoxide (mg) | Refractive Index | Additives (mg)/ procedure | % Transmission 350 nm | % Transmission 400 nm | % Transmission 450 nm |
|---|---|---|---|---|---|---|---|
| 7-91-22 | tetrasiloxane (32.5) tetravinyl methylcyclo-tetrasiloxane (9.0) | Ti(iPr): 28.3 | 1.7032 | VC (137.5) | 0.4 | 20.1 | 26.4 |
| 7-91-29 | tetravinyl methylcyclo-tetrasiloxane (6.9) | TiAA: 26.7 | 1.7102 | VC (128.6) | 0.3 | 13 | 35.1 |

*The film quality is low and opaque. For samples 7-36-07 and 7-45-21, the composition films did not cure.
**Good film quality but opaque (sample 7-91-14).
***In measuring this refractive index of the film, the figure did not form an acceptable knee.

Discussion:

As discussed in example 15, it is presently believed that poor agitation of the nanoparticles lead to increased particle sizes of the titanium oxide nanoparticles. In order to achieve a good agitation, ultrasonic energy was used. However, as shown by sample 7-47-2 in Table 12, sonication of silicone resin did not resolve the problem. Presumably, the curing of siloxane resin was accelerated due to inevitable hot spots formed during processing which lead to localized gelation and resulted in lower transmittance.

Figure 9:
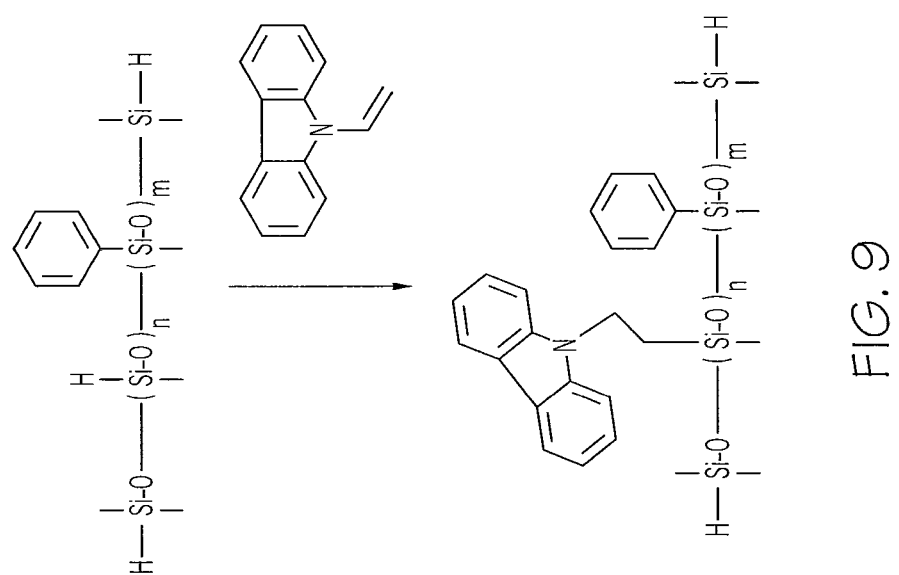
FIG. 9 is a flow chart illustrating a method for introducing a carbazole functional group to a siloxane backbone via a hydrosilylation reaction in which 9-vinyl-9H-carbazole reacts with hydride terminated poly (alkyl aryl siloxane) to form a carbazole modified silane, including chemical structures associated with starting materials, intermediates, and final product.

In evaluating different types of low viscosity silicone resins, commercially available poly(alkyl aryl siloxanes), namely Gelest silicone resins, with different functionalities were studied in this example. Specifically, two types of LVSR were intensively examined: silanol terminated poly (alkyl aryl siloxanes) (Gelest silanol) and hydride terminated poly (alkyl aryl siloxanes) (Gelest hydride). FIG. 9 shows a method of introducing a carbazole function group to a siloxane backbone via a hydrosilylation reaction between a hydride terminated poly (alkyl aryl siloxanes) and 9-vinyl-9H-carbazole.

Both types of LVSR increased refractive index values to 1.6/1.7. However, Gelest hydride was much more difficult to handle than Gelest silanol. While not wishing to be bound by theory, it is presently believed that a hydride functional group is more reactive than a hydroxy functional group, which increased viscosities of the solutions significantly and resulted in poor agitation of the materials. In order to achieve better mixing results, attempts were made to sonicate Gelest hydride with VC or to let VC and Gelest hydride sit together after 20 minutes mixing for 6 or even 24 hours. However, these samples did not show any improvement in transmittance at 350 nm or above. Therefore, while not wishing to be bound by theory, it is presently believed that silanol terminated low viscosity silicone resin is able to attach a carbazole functional group onto its siloxane backbone via a hydrosilylation reaction with a vinyl carbazole (VC). Please see FIG. 9 for an example of a hydrosilylation reaction between a siloxane resin and a carbazole derivative.

Encouragingly, Table 14 shows that silicone resins (siloxanes) were macroscopically compatible with carbazole modified silane (sample 6-94-21, prepared according to example 10A). However, only tetravinyl-dimethylsiloxane based formulations produced thick films (>5 μwet films thickness). While not wishing to be bound by theory, it is presently believed that comparing to silanol terminated or hydride terminated poly (alkyl aryl siloxanes), vinyl terminated poly (alkyl aryl siloxanes) based formulations are able to produce more processable high refractive index compositions.

It was clear that the reactivity of carbazole modified silane toward silicone resins, as well as titanium, was the key to forming high refractive index compositions with adequate light transmission.

Example 21

This example illustrates the enhancement of refractive index values of poly(aryl alkyl silicone) resin by applying a thin layer of titanium dioxide film.

Procedure:

A specified amount of titanium alkoxide was added to one or more specified additives and were mixed together for 10 minutes on a stir plate with a magnetic stirrer. The mixture was spin coated on a poly(aryl alkyl silicone) disc and heated in the convection oven at 80° C. for 30 min.

The formulation details are given in Table 15 along with refractive index values and the UV transmittance of the product at specified wavelengths. Please note: the total sample weights did not exceed 5 g, and the percentages are all percentages by weight (wt %).

TABLE 15

Formulation details, RI and UV transmittance of the product at specified wavelengths.

| Sample # | Siloxane type | Titanium precursor (mg) | Refractive Index | Additives (mg)/comments | % Transmission 350 nm | % Transmission 400 nm | % Transmission 450 nm |
|---|---|---|---|---|---|---|---|
| 7-44-10 | SCR-1011 thick base coat | Ti(iPr): 91.3 | 1.6784 | VC-Si (sample 6-92-34, 185.6); ~2 um film over SCR-1011 | 21.2 | 68.2 | 79.4 |

TABLE 15-continued

Formulation details, RI and UV transmittance of the product at specified wavelengths.

| Sample # | Siloxane type | Titanium precursor (mg) | Refractive Index | Additives (mg)/comments | % Transmission 350 nm | 400 nm | 450 nm |
|---|---|---|---|---|---|---|---|
| 7-55-5 | SCR-1011 thick base coat | Ti(iPr): 1400 | 1.718 | AAEM (50); 0.5 um film over SCR-1011 | 66.7 | 82.9 | 79.5 |

Discussion:

Table 15 shows that the addition of a titanium oxide layer with either a carbazole-silane or an AAEM additive on a siloxane resin increased the refractive index values of resulting coatings significantly while achieving acceptable light transmission.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

The invention claimed is:

1. A high refractive index composition, comprising a reaction product of
   a. an organic compound (1) obtained by coupling two reactive groups (a) and (b), wherein
      i. the reactive group (a) is Y—(CH$_2$)n-Si(O—R)$_3$, wherein R is CH$_3$, C$_2$H$_5$, C$_3$H$_8$, or C$_4$H$_{10}$; and Y is —NH$_2$, —COOH, —NCO, or epoxy; and
      ii. the reactive group (b) is a carbazole, fluorene, imidazole with one or more functional groups selected from a group consisting of —OH, —NH$_2$, —COOH, —NCO, -epoxy, -vinyl, -acrylic, -acyl, -alkyl, -halide, -amino, -ketone, -allyl, -allylic, -thiol, -isocyanate, and a mixture thereof; and
   b. a metal alkoxide.

2. The composition according to claim 1, wherein the reactive group (a) is 3-(triethoxysilyl)propyl isocyanate, and the reactive group (b) is 2-(9H-carbazole -9-yl) ethanol.

3. The composition according to claim 1, further comprises an acrylate compound, a diketonate compound of structure 1, or a mixture thereof; wherein the diketonate compound of structure 1 comprises

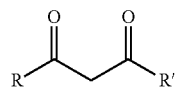

wherein R or R'=H, an alkyl group having up to 12 carbons, an acrylic group, a carboxylic group, an vinyl group, a ketone group, an allyl group, or a mixture thereof.

4. The composition according to claim 1, further comprises 2-(methacryloyloxy)ethyl 3-oxobutanoate.

5. The composition according to claim 1 further comprises carbazole.

6. The composition according to claim 1, further comprises an organic compound (2) comprising a compound A, a compound B, a compound C, or a mixture thereof; wherein a. the compound A comprises

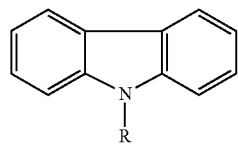

wherein R is —H,

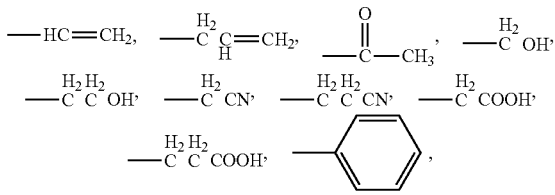

or a mixture thereof;

b. the compound B comprises

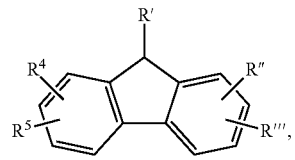

wherein R' is —H, —OH, —CHO, —C═O, or —COOH; R" is —H, —F, —OH, NH$_2$, —COOH, -acyl, -allyl, -ketone, or -isocyanate; and R'" is —NH$_2$, or -the compound A; R$^4$ is —H, —F, —OH, NH$_2$, —COOH, -acyl, -allyl, -ketone, or -isocyanate; and R$^5$ is —NH$_2$, or -the compound A; and c. the compound C comprises

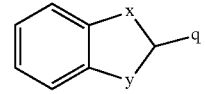

where x is —S, —N, or —O; y is —N or —C; and q is

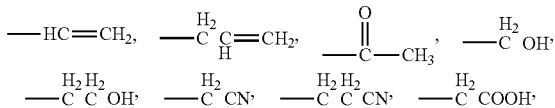

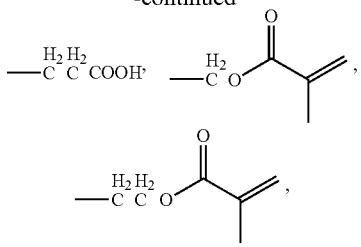

or a mixture thereof.

7. The composition according to claim 1, further comprises a diketonate compound of a structure 2, a structure 3, or a mixture thereof, wherein a. the structure 2 comprises

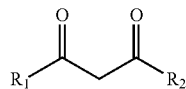

wherein $R_1$ and $R_2$=an aromatic ring, a poly-aromatic ring, or a mixture thereof; and wherein $R_1$ and $R_2$ can be the same or different; and b. the structure 3 comprises

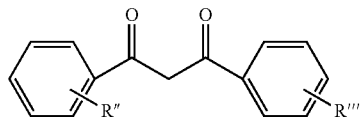

wherein R" and R'"=H, an aromatic ring, a poly-aromatic ring, a carboxylic group, a vinyl group, a halide group, a ketone group, an allyl group, or a mixture thereof; wherein R" and R'" can be the same or different.

8. The composition according to claim 1, wherein the metal in the metal alkoxide is selected from the group consisting of Ti, Zr, V, Mg, Al, Mn, Sb, Ba, Ca, Ce, Si, and Sn.

9. The composition according to claim 1, wherein the metal alkoxide is titanium alkoxide with a general formula of $Ti(OR_3)_4$ wherein $R_3$ is an alkyl group having up to 8 carbon atoms.

10. The composition according to claim 1, wherein the composition is useful modifying light transmittance and/or light absorbance.

* * * * *